US012665767B2

(12) United States Patent
Nagao

(10) Patent No.: US 12,665,767 B2
(45) Date of Patent: Jun. 23, 2026

(54) IMAGE PROCESSING APPARATUS, SYSTEM, AND DATA MANAGEMENT METHOD

(71) Applicant: SHARP KABUSHIKI KAISHA, Sakai City (JP)

(72) Inventor: Tsuyoshi Nagao, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 350 days.

(21) Appl. No.: 18/239,632

(22) Filed: Aug. 29, 2023

(65) Prior Publication Data

US 2024/0089114 A1 Mar. 14, 2024

(30) Foreign Application Priority Data

Sep. 8, 2022 (JP) ................................. 2022-143182

(51) Int. Cl.
*H04L 29/06* (2006.01)
*H04L 9/32* (2006.01)
(52) U.S. Cl.
CPC .......... *H04L 9/3236* (2013.01); *H04L 9/3213* (2013.01)
(58) Field of Classification Search
CPC ... H04L 9/3236; H04L 9/3213; H04L 9/0894; H04L 9/3297
See application file for complete search history.

(56) References Cited

U.S. PATENT DOCUMENTS

| | | | | |
|---|---|---|---|---|
| 2008/0273220 A1* | 11/2008 | Couchman | ......... | H04N 1/00968 |
| | | | | 358/1.15 |
| 2014/0143446 A1* | 5/2014 | Jacobson | ............ | H04L 67/1095 |
| | | | | 709/248 |
| 2016/0147787 A1* | 5/2016 | Ables | .................... | G06F 16/178 |
| | | | | 707/694 |
| 2018/0352156 A1* | 12/2018 | Garrido | .................. | H04N 7/147 |
| 2020/0356534 A1* | 11/2020 | R | ............................ | G06F 9/526 |
| 2021/0409227 A1* | 12/2021 | Ponnuswamy | ....... | H04L 9/0825 |

FOREIGN PATENT DOCUMENTS

| | | | | | |
|---|---|---|---|---|---|
| CN | 104618503 B | * | 6/2019 | ............. | H04L 67/10 |
| CN | 113204534 A | * | 8/2021 | ............. | G06F 16/13 |
| JP | 2013-186613 A | | 9/2013 | | |
| JP | 2016-192644 A | | 11/2016 | | |
| KR | 20030065774 A | * | 8/2003 | ........... | H04L 9/3297 |
| WO | WO-2020037400 A1 | * | 2/2020 | ............. | G06F 21/64 |

* cited by examiner

*Primary Examiner* — Shawnchoy Rahman

(74) *Attorney, Agent, or Firm* — ScienBiziP, P.C.

(57) ABSTRACT

An image processing apparatus includes a storage and a controller. The storage stores acquired data, and the controller verifies authenticity of the data. When the authenticity of the data is confirmed, the controller transmits the data to a service and deletes the data from the storage.

13 Claims, 20 Drawing Sheets

FIG. 11

| TRANSMITTER INFORMATION | STORAGE DESTINATION FOLDER NAME |
|---|---|
| 03-3000-AAAA | [USER A] FOLDER |
| 03-3000-BBBB | [USER B] FOLDER |
| userC@example. com | [USER C] FOLDER |
| ⋮ | ⋮ |

FIG. 14

| SERVICE NAME | ACCESS POINT | AUTHENTICATION INFORMATION | TRANSMITTER INFORMATION | |
|---|---|---|---|---|
| AAA Drive | https://aaadrive.com/upload | ID:a-sha PW:abc123 | 03-3000-AAAA userC@example.com | D300 |
| BBB Drive | https://bbbdrive.com/put | ID:a-sha PW:xyz789 | 03-3000-BBBB userD@example.com | |
| CCC Service | https://cccservice.jp/share | ID:a-sha-keiri PW:qwerty | userC@example.com | D302 |
| DDD Mail | eigyo@a-sha.dddmail.com | ID:eigyo PW:EIGY012345 | userD@example.com | |
| ⋮ | ⋮ | ⋮ | ⋮ | |
| ZZZ Drive | https://zzzdrive.com/upload | ID:a-sha PW:a-sha-2022 | OTHER THAN THE ABOVE | D304 |

IMAGE PROCESSING APPARATUS, SYSTEM, AND DATA MANAGEMENT METHOD

BACKGROUND OF THE INVENTION

Field of the Invention

The present disclosure relates to an image processing apparatus and the like.

Description of the Background Art

A data communication technique has generally been available for an image processing apparatus. For example, the image processing apparatuses such as multifunction peripherals have been used. Some of the multifunction peripherals have a facsimile function that is a function to transmit and receive image data.

The following technique has conventionally been proposed. For example, in the case where a caller's telephone number is not registered in a telephone number information list, or in the case where an identification signal is received without receiving the caller's telephone number, facsimile data is sequentially stored. Then, every time a predetermined unit of the facsimile data is stored, the predetermined unit of the facsimile data is transmitted to a cloud server, and the predetermined unit of the facsimile data is then deleted. The following technique has also been proposed. A first hash value that is generated from the image data is matched against a second hash value that is generated from the image data transferred to the cloud server side. In this way, integrity of the transferred image data is verified.

In general, a FAX (facsimile) document has an evidentiary value. Thus, unless processing is explicitly specified to delete data (linked data) of the FAX document after transferring, the linked data is not deleted from the multifunction peripheral and remains therein. In other words, even in the case where the multifunction peripheral is set to be linked with a cloud service, and the data of the FAX document is linked (transferred) to the cloud service, the data of the FAX document remains to be stored in the multifunction peripheral until the FAX document is printed (output) on a piece of paper such as recording paper. This has resulted in a problem of inefficient use of memory of the multifunction peripheral. Even in the case where the paper output of the FAX data is not desired, there has been a problem that the FAX data is output onto the sheet of paper due to the reason that the FAX document remains to be stored.

For example, in general, as a processing method that can be specified when the FAX data is received, a processing method such as transferring, printing, deleting, transferring and printing, transferring and deleting, or performing nothing (storing only) can be specified. In this case, even when "transferring" is specified as the processing method, the FAX data is not deleted from the multifunction peripheral simply upon completion of transferring. In addition, in the case where transferring and deleting is specified as the processing method of the FAX data, it is unclear whether non-falsified FAX data has been transferred. Thus, there has been a problem that there is no proof of existence or non-falsification of the transferred FAX data.

Regarding this problem, in the conventional technique, it is impossible to prove that the FAX data is not falsified when the FAX data is transmitted to the cloud service. For example, in the conventional technique, the proof of the non-falsification of the FAX data is not taken into consideration. In addition, in the conventional technique, it is assumed that the image data is downloaded from the cloud service. Thus, when the image data is not downloaded, it is impossible to verify that the FAX data is not falsified.

These problems do not only occur in relation to the FAX data, and similar problems occur to data that is acquired by the multifunction peripheral.

The present disclosure has been made in view of the above-described problems and therefore has a purpose of providing an image processing apparatus and the like that appropriately delete acquired data after transmitting the acquired data to another service.

SUMMARY OF THE INVENTION

An image processing apparatus according to the present disclosure includes a storage and a controller. The storage stores acquired data, and the controller verifies authenticity of the data. When the authenticity of the data has been confirmed, the controller transmits the data to a service and deletes the data from the storage.

A system according to the present disclosure is a system including an image processing apparatus that can communicate with a cloud service. The image processing apparatus adds a time stamp to acquired data and stores the data. The cloud service stores the data added with the time stamp. In the case where the time stamp of the data that is stored in the image processing apparatus matches the time stamp of the data that is stored in the cloud service, the image processing apparatus deletes the data that is added with the time stamp and is stored in the image processing apparatus.

A data management method according to the present disclosure is a data management method including: storing acquired data in a storage device; verifying authenticity of the data; when the authenticity of the data has been confirmed, transmitting the data to a service and deleting the data from the storage device.

According to the present disclosure, it is possible to provide the image processing apparatus and the like capable of appropriately deleting the acquired data after transmitting the acquired data to the other service.

BRIEF DESCRIPTION OF THE DRAWINGS

FIG. 11 is a table illustrating an exemplary data structure of storage destination information in the second embodiment.

FIG. 14 is a table illustrating an exemplary data structure of cloud service information in the third embodiment.

DESCRIPTION OF THE PREFERRED EMBODIMENTS

A description will hereinafter be made on embodiments for carrying out the present disclosure with reference to the drawings. Each of the following embodiments is merely an example for describing the present disclosure, and the technical scope of the disclosure set forth in the claims is not limited to the description below.

1. First Embodiment

In a first embodiment, a description will be made on an example of FAX data received via a FAX line as data received by an image processing apparatus. The following data received by the image processing apparatus is not limited to the FAX data. For example, instead of the FAX data, the data received by the image processing apparatus may be content data, such as image data or document data, received from another device.

1.1 Overall Configuration

Figure 1:
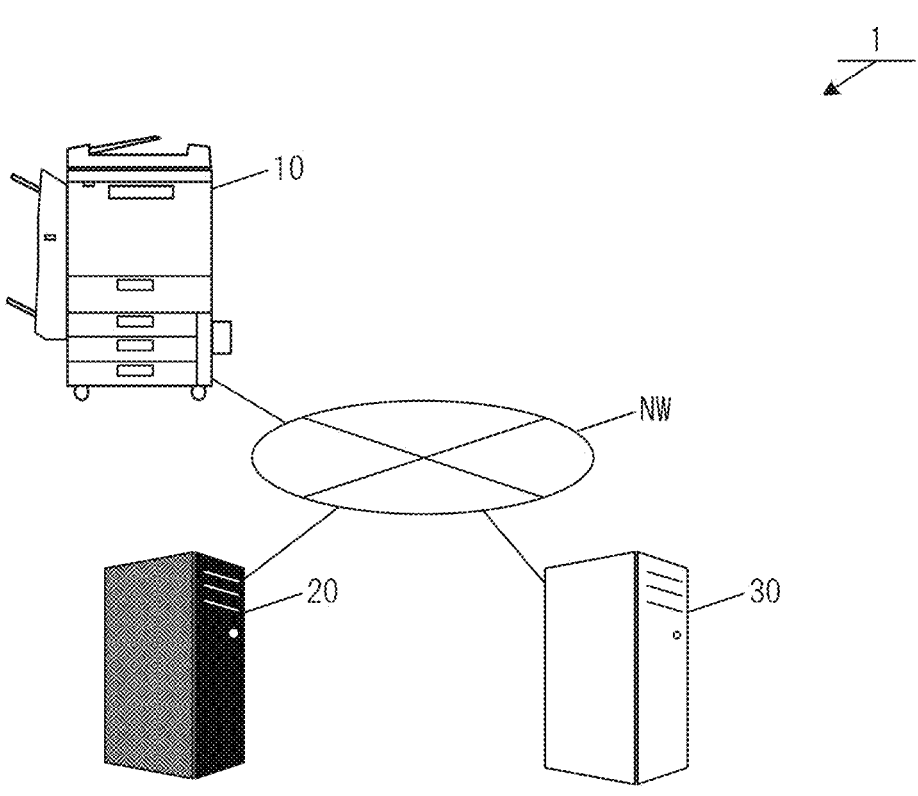
FIG. 1 is an overall configuration view of a system in a first embodiment.

FIG. 1 is an overall configuration view of a system 1 including a multifunction peripheral 10, to which the image processing apparatus in the present disclosure is applied. As illustrated in FIG. 1, in the system 1 of the present embodiment, the multifunction peripheral 10, an authentication server 20, and a cloud server 30 are connected via a network NW. The network NW will be described as an external network (a wide area network (WAN)) such as the Internet. However, the network NW may be a network other than the Internet (for example, a local area network (LAN)).

The multifunction peripheral 10 is an image processing apparatus that has a copy function, a scan function, a print function, a FAX function, and the like, and is also referred to as a multifunction printer/peripheral (MFP).

Each of the authentication server 20 and the cloud server 30 is an information processing device that provides a predetermined service. Each of the authentication server 20 and the cloud server 30 includes a computer such as a server, for example. Each of the authentication server 20 and the cloud server 30 may include plural devices or may include a virtual server that is implemented on the respective information processing device.

The authentication server 20 provides a function and a service that are used to verify data authenticity and the like. In the present embodiment, the service provided by the authentication server 20 will be referred to as an authentication service. In general, the authentication service is provided by a third party (an external organization).

For example, the authentication server 20 provides a time stamping service as the authentication service. The time stamping service is a service that adds a time stamp token to data (for example, a file) transmitted to the authentication server 20. The time stamp token is data that includes: a hash value that is calculated from data to be added with the time stamp token; and time information on time at which the hash value is calculated. The hash value is a return value of a hash function to generate a fixed length of a bit string that is calculated from an appropriate length of a bit string by predetermined arithmetic operation. It is possible with the time stamp token to prove existence of the data and verify that the data has not been falsified. More specifically, it is proven that the data, from which the hash value is calculated, exists at the time that is indicated by the time information included in the time stamp token. In the case where the hash value included in the time stamp token matches the hash value calculated from the data, to which the time stamp token is added, it is proven that the data is not modified (falsified) at the time when the time stamp token is added onward. In the present embodiment, the time stamp token will also be described as a time stamp. In addition, in the present embodiment, a description will be made that the service provided by the authentication server 20 is the time stamping service.

The cloud server 30 provides a service to store data that is transmitted from other devices. The cloud server 30 may be a server that provides an online storage (cloud storage) service or may be a mail server that provides a mail service. In the present application specification, the service provided by the cloud server 30 will be described as a cloud service.

The multifunction peripheral 10 has a linkage function with the cloud service. The linkage function with the cloud service is a function to transmit the data managed by the multifunction peripheral 10 to the cloud service and thereby store such data in the cloud service. A description will be made on an example in which the multifunction peripheral 10 in the present embodiment stores (links) received FAX data in (with) the cloud service as the linkage function with the cloud service.

The system 1 may include plural different cloud services. In this case, the cloud server 30 is connected to the network NW for each of the cloud services. In addition, the multifunction peripheral 10 has the linkage function with each of the cloud services.

1.2 Functional Configuration 1.2.1 Multifunction Peripheral

Figure 2:
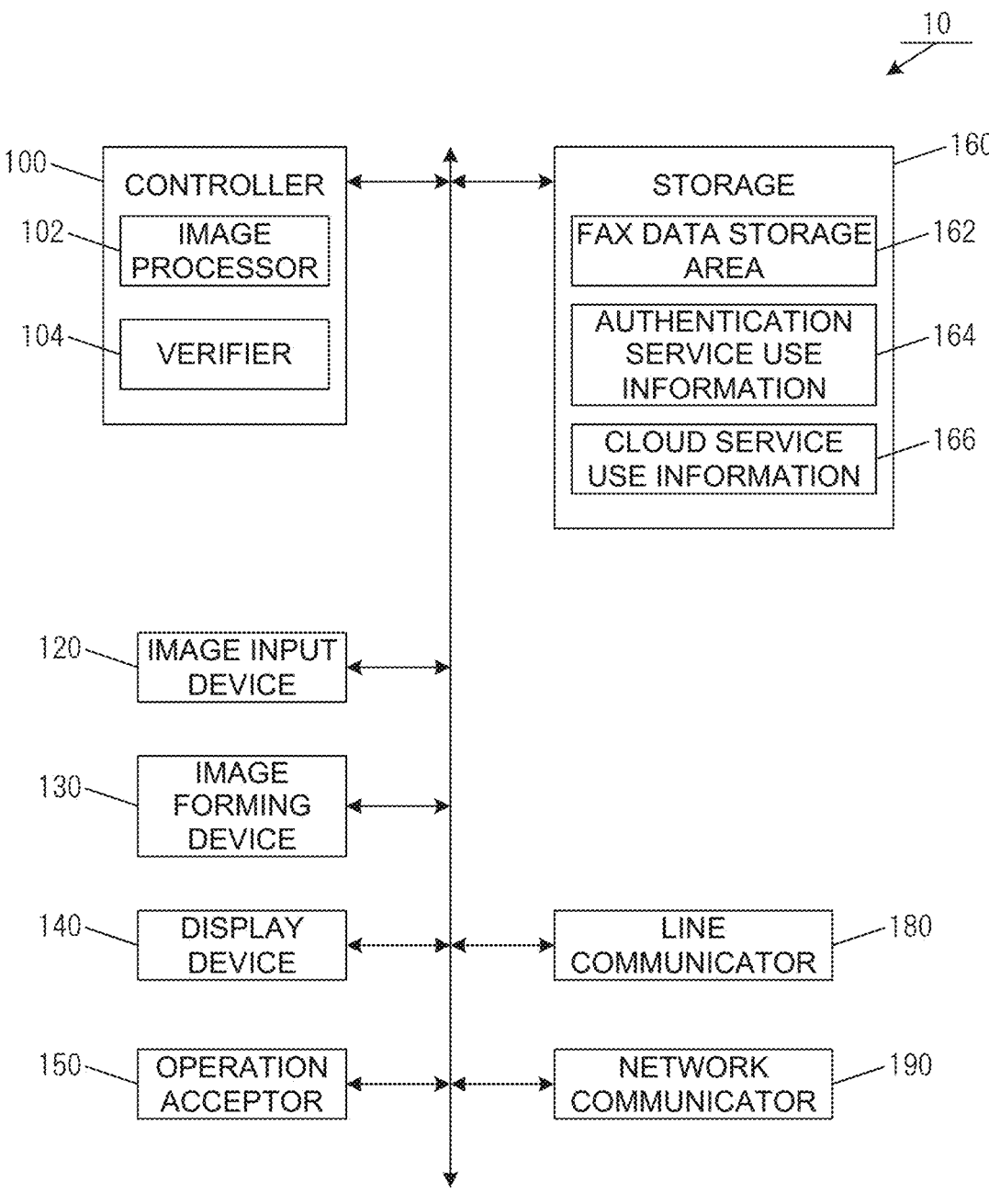
FIG. 2 is a functional configuration diagram of a multifunction peripheral in the first embodiment.

FIG. 2 is a diagram illustrating a functional configuration of the multifunction peripheral 10 in the present embodiment. The multifunction peripheral 10 includes a controller 100, an image input device 120, an image forming device 130, a display device 140, an operation acceptor 150, a storage 160, a line communicator 180, and a network communicator 190.

The controller 100 is a control device that controls the entire multifunction peripheral 10. The controller 100 reads and executes various programs stored in the storage 160 to implement various functions, and includes one or more central processing units (CPUs), and the like, for example. The controller 100 may be a system on a chip (SoC) having plural functions of the functions described below.

The controller 100 functions as an image processor 102 and a verifier 104 by executing the program stored in the storage 160.

The image processor 102 executes various types of processing related to images. For example, the image processor 102 executes sharpening processing and/or gradation conversion processing on an image that is input via the image input device 120, the line communicator 180, or the network communicator 190.

The verifier 104 verifies the data authenticity. The authenticity is a property indicating a state where data has not been falsified, modified, deleted, switched, or the like. An example of an authenticity verification method is a method for determining whether the hash value calculated from the data at certain timing matches the hash value calculated from the data at another timing. The hash value is a value that is uniquely defined from the data by a calculation using a predetermined algorithm (the hash function). For example, a hash function such as SHA-2 is used as the hash function. In this case, when the two hash values match each other, it is possible to prove that two pieces of the data match each other and are not falsified, modified, deleted, or switched. On the other hand, when the two hash values do not match each other, one piece of the data is possibly falsified, modified, deleted, or switched.

For example, the verifier 104 executes processing to transmit the data that is subject to authenticity verification to the time stamping service and to acquire the time stamp token for the data from the time stamping service. In addition, the verifier 104 calculates the hash value of the data that is subject to the authenticity verification. A hash value calculation method (the hash function) used by the verifier 104 is the same as a hash value calculation method (the hash function) used by the time stamping service. In this case, when the hash value that is included in the time stamp token acquired from the time stamping service matches the hash value that is calculated by the verifier 104, the data that is transmitted to the time stamping service matches the data that is subject to hash value calculation by the verifier 104. In the case where the hash values are the same, it is possible to assume that the data subject to the hash value calculation has not been falsified or the like and to confirm (verify) the data authenticity. As described above, the hash value is identification information that can be used to identify identity of the data. Processing executed by the verifier 104 will be described below.

The image input device 120 inputs an image to the multifunction peripheral 10. For example, the image input device 120 includes a scanner device that reads a document placed on a document table, and the like. The scanner device is, for example, a device that uses an image sensor such as a charge-coupled device (CCD) or a contact image sensor (CIS) to convert the image into an electric signal, and quantizes and encodes the electric signal. The image input device 120 may include an interface (a terminal) for reading an image stored in universal serial bus (USB) memory and input the image read from the USB memory. In addition, the image input device 120 may receive an image from another device via the network communicator 190 and input the image.

The image forming device 130 forms (prints) an image on a recording medium such as recording paper. The image forming device 130 includes a printing device such as a laser printer that uses an electrophotographic method, for example. For example, the image forming device 130 feeds the recording paper from a paper feed tray provided to the multifunction peripheral 10, forms an image on a surface of the recording paper, and discharges the recording paper from a paper discharge tray provided to the multifunction peripheral 10.

The display device 140 displays various types of information. The display device 140 includes a display such as a liquid crystal display (LCD), an organic electroluminescence (EL) display, or a micro light emitting diode (LED) display.

The operation acceptor 150 accepts an operation instruction from a user of the multifunction peripheral 10. The operation acceptor 150 includes an input device such as a key switch (a hard key) or a touch sensor. A method for detecting an input by contact (touch) with the touch sensor may be any typical detection method, such a resistive method, an infrared method, an inductive method, or an electrostatic method. The multifunction peripheral 10 may be equipped with a touch panel in which the display device 140 and the operation acceptor 150 are formed as a single unit.

The storage 160 stores the various programs required for operation of the multifunction peripheral 10 and various types of the data. The storage 160 includes storage devices such as a solid-state drive (SSD), which is semiconductor memory, and a hard disk drive (HDD).

The storage 160 secures a FAX data storage area 162 as a storage area, and stores authentication service use information 164 and cloud service use information 166.

The FAX data is stored in the FAX data storage area 162. The FAX data is data that is sent/received via FAX communication, and is image data on text or an image such as FAX text or a FAX image. For the FAX communication, the FAX line adopting G3/G4 standards can be used, or the Internet FAX using the Internet network can be used.

Information on the FAX data may also be stored in the FAX data. For example, the FAX data may include, as attribute information, information on received date and time of the FAX data, transmitter information (transmitting subscriber identification (TSI)), and the like.

The transmitter information is information on a transmission source (a transmitter) of the FAX data. For example, the transmitter information may be a telephone number (a FAX number) of the transmission source of the FAX data, or may be a name (a transmission source name) that corresponds to the telephone number (the FAX number). As the information on the transmission source, a source name (RTI) included in the TSI or a source FAX number (CSI) may be used. Alternatively, an address book may be stored in advance in the storage 160, and a name or the like stored in the address book may be used as the transmitter information.

The authentication service use information 164 is information that is used to use the authentication service. For example, the authentication service use information 164 includes: information (for example, a uniform resource locator (URL) or the Internet Protocol (IP) address) on a connection destination of the authentication server 20; and authentication information (for example, a username and a password) that is used when the authentication service is used.

The cloud service use information 166 is information that is used to use the cloud service. For example, the cloud service use information 166 includes: information (for example, an URL or an IP address) on a connection destination of the cloud server 30; and authentication information (for example, a username and a password) that is used when the cloud service is used.

The line communicator 180 communicates with the external device via a public line (for example, a general telephone line). The line communicator 180 includes a terminal, into which a cable connectable to the public line can be plugged, for example.

The network communicator 190 communicates with the other devices and equipment, such as the authentication server 20, via the network such as the LAN or the WAN. The network communicator 190 includes, for example, a communication device, such as a network interface card (NIC), and a communication module used in the wired/wireless LAN. The network communicator 190 may include an interface (a network I/F) that can be connected to the network.

1.2.2 Authentication Server

Figure 3:
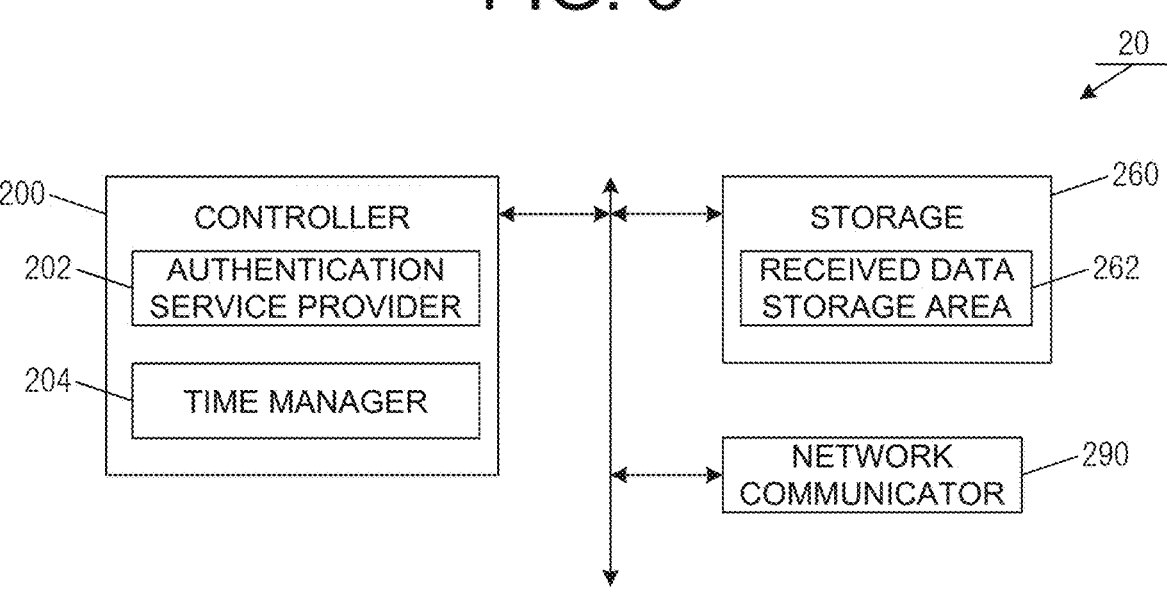
FIG. 3 is a functional configuration diagram of an authentication server in the first embodiment.

FIG. 3 is a diagram illustrating a functional configuration of the authentication server 20 in the present embodiment. The authentication server 20 includes a controller 200, a storage 260, and a network communicator 290.

The controller 200 is a functional device for controlling the entire authentication server 20. The controller 200 reads and executes various programs stored in the storage 260 to implement various functions, and includes one or more CPUs, and the like, for example. The controller 200 may include an SoC having plural functions of the functions described below.

The controller 200 functions as an authentication service provider 202 and a time manager 204 by executing the program stored in the storage 260.

The authentication service provider 202 provides the authentication service. For example, the authentication service provider 202 provides the time stamping service. In this case, the authentication service provider 202 calculates the hash value for the data received from the other device by using the function such as SHA-2. In addition, the authentication service provider 202 adds the time stamp token, which includes the calculated hash value and the time at which the hash value is calculated, to the data that is subject to the hash value calculation. The hash function used by the authentication service provider 202 is specified in advance by a service administrator or the like. Processing executed by the authentication service provider 202 will be described below.

The time manager 204 manages time at the authentication server 20. For example, the time manager 204 periodically executes processing to synchronize the time of the authentication server 20 with time of a Network Time Protocol (NTP) server in parallel with the processing to provide the time stamping service by the authentication service provider 202. In this way, the time manager 204 periodically adjusts the time of the authentication server 20.

The storage 260 stores the various programs required for operation of the authentication server 20 and various types of the data. The storage 260 includes storage devices such as an SSD, which is semiconductor memory, and an HDD. In addition, the storage 260 secures, as a storage area, a received data storage area 262 for storing the data received from the other devices.

The network communicator 290 communicates with the other devices and equipment, such as the multifunction peripheral 10, via the network such as the LAN or the WAN. The network communicator 290 includes, for example, a communication device, such as an NIC, and a communication module used in the wired/wireless LAN. The network communicator 290 may include an interface (a network I/F) that can be connected to the network.

1.2.3 Cloud Server

Figure 4:
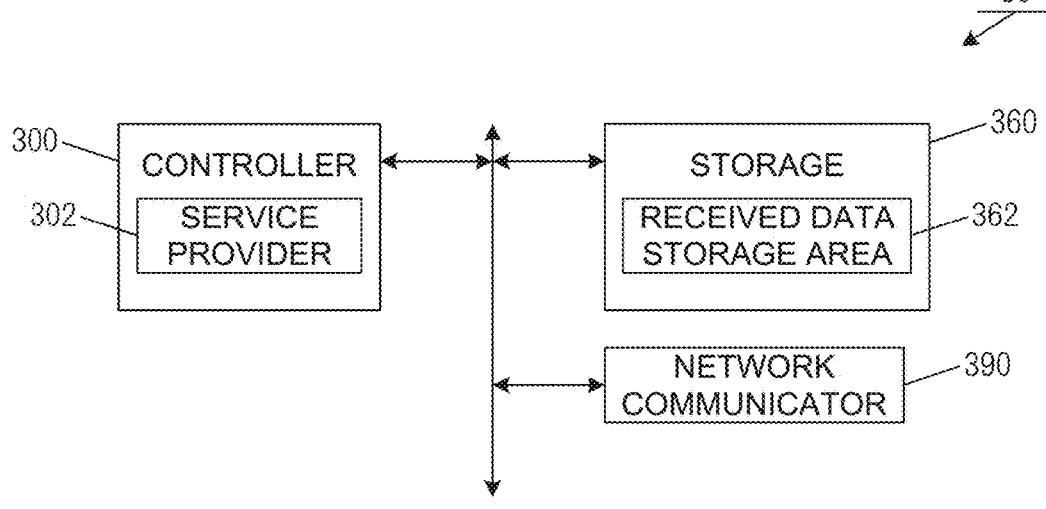
FIG. 4 is a functional configuration diagram of a cloud server in the first embodiment.

FIG. 4 is a diagram illustrating a functional configuration of the cloud server 30 in the present embodiment. The cloud server 30 includes a controller 300, a storage 360, and a network communicator 390.

The controller 300 is a functional device for controlling the entire cloud server 30. The controller 300 reads and executes various programs stored in the storage 360 to implement various functions, and includes one or more CPUs, and the like, for example. The controller 300 may include an SoC having plural functions of the functions described below.

The controller 300 functions as a service provider 302 by executing the program stored in the storage 360. The service provider 302 provides a service to store the data that is received from the external device. For example, the service provider 302 provides the online storage (cloud storage) service and the mail service. Processing executed by the service provider 302 will be described below.

The storage 360 stores the various programs required for operation of the cloud server 30 and various types of the data. The storage 360 includes storage devices such as an SSD, which is semiconductor memory, and an HDD. In addition, the storage 360 secures, as a storage area, a received data storage area 362 for storing the data received from the other devices.

The network communicator 390 communicates with the other devices and equipment, such as the multifunction peripheral 10, via the network such as the LAN or the WAN. The network communicator 390 includes, for example, a communication device, such as an NIC, and a communication module used in the wired/wireless LAN. The network communicator 390 may include an interface (a network I/F) that can be connected to the network.

1.3 Processing Flow 1.3.1 Overall Processing Flow

Figure 5:
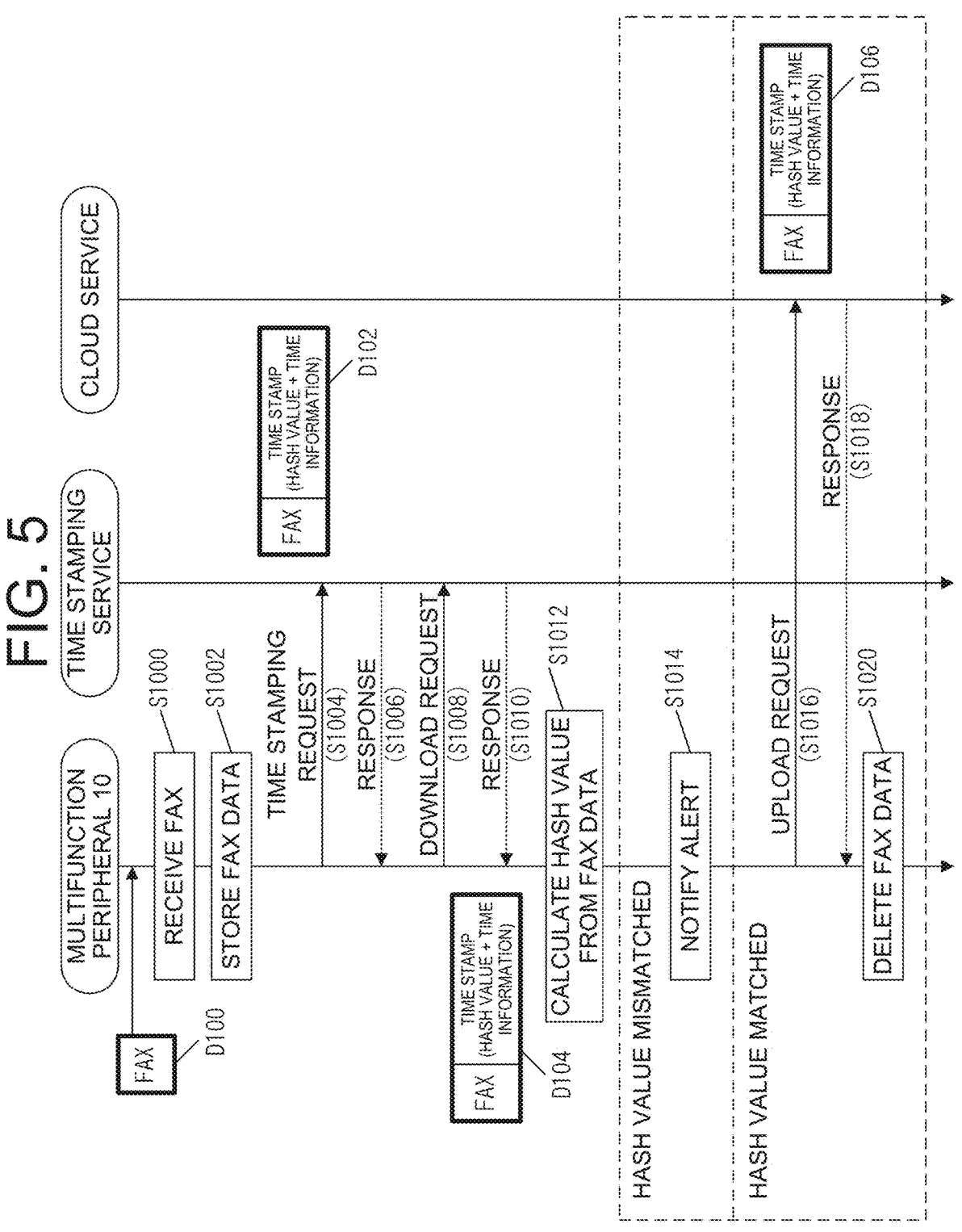
FIG. 5 is a sequence chart illustrating a flow of processing in the first embodiment.

FIG. 5 is a sequence chart illustrating a flow of processing that is executed by the apparatus and the devices included in the system 1. In the present embodiment, when the multifunction peripheral 10 receives the FAX data (D100 in FIG. 5) (S1000), the FAX data is stored in the FAX data storage area 162 (S1002). Furthermore, the multifunction peripheral 10 transmits, to the time stamping service, a request to add the time stamp token to the FAX data received in S1000 (a time stamping request) (S1004). At this time, the multifunction peripheral 10 transmits the FAX data, which is received in S1000, to the time stamping service.

When receiving the time stamping request from the multifunction peripheral 10, the time stamping service provided by the authentication server 20 issues the time stamp token for the FAX data transmitted from the multifunction peripheral 10 and associates the time stamp token with the FAX data. The time stamp token may be managed separately from the FAX data or may be added to the FAX data. However, in the present embodiment, a description will be made on that the time stamp token is added to the FAX data. In addition, in the time stamping service, data (D102 in FIG. 5) in which the time stamp token is added to the FAX data is stored. Furthermore, the time stamping service transmits a response to the multifunction peripheral 10 that is a transmission source of the time stamping request (S1006).

When receiving the response from the time stamping service, the multifunction peripheral 10 transmits, to the time stamping service, a request to download the FAX data, to which the time stamp token is added (a download request) (S1008). When receiving the download request from the multifunction peripheral 10, the time stamping service transmits, to the multifunction peripheral 10, the requested data as a response (S1010). The multifunction peripheral 10 thereby acquires the FAX data (D104 in FIG. 5), to which the time stamp token is added.

Next, the multifunction peripheral 10 calculates the hash value from the FAX data that is stored in step S1002 (S1012). The multifunction peripheral 10 then compares the hash value calculated in step S1012 with the hash value included in the time stamp token.

In the case where the hash values do not match, the multifunction peripheral 10 notifies of an alert (S1014). On the other hand, in the case where the hash values match each other, the multifunction peripheral 10 transmits, to the cloud service, a request to upload the FAX data, which is added with the time stamp token (an upload request) (S1016).

When receiving the upload request from the multifunction peripheral 10, the cloud service provided by the cloud server 30 stores the FAX data that is transmitted from the multifunction peripheral 10 and added with the time stamp token (D106 in FIG. 5), and transmits a response to the multifunction peripheral 10 (S1018).

After receiving the response from the cloud service, the multifunction peripheral 10 deletes the FAX data corresponding to the uploaded data (the FAX data stored in step S1002) from the FAX data storage area 162 (S1020). In this way, the FAX data uploaded to the cloud service is deleted from the multifunction peripheral 10. A description will hereinafter be made on the processing that is executed by each of the apparatus and the devices included in the system 1.

1.3.2 Flow of Processing in Multifunction Peripheral

Figure 6:
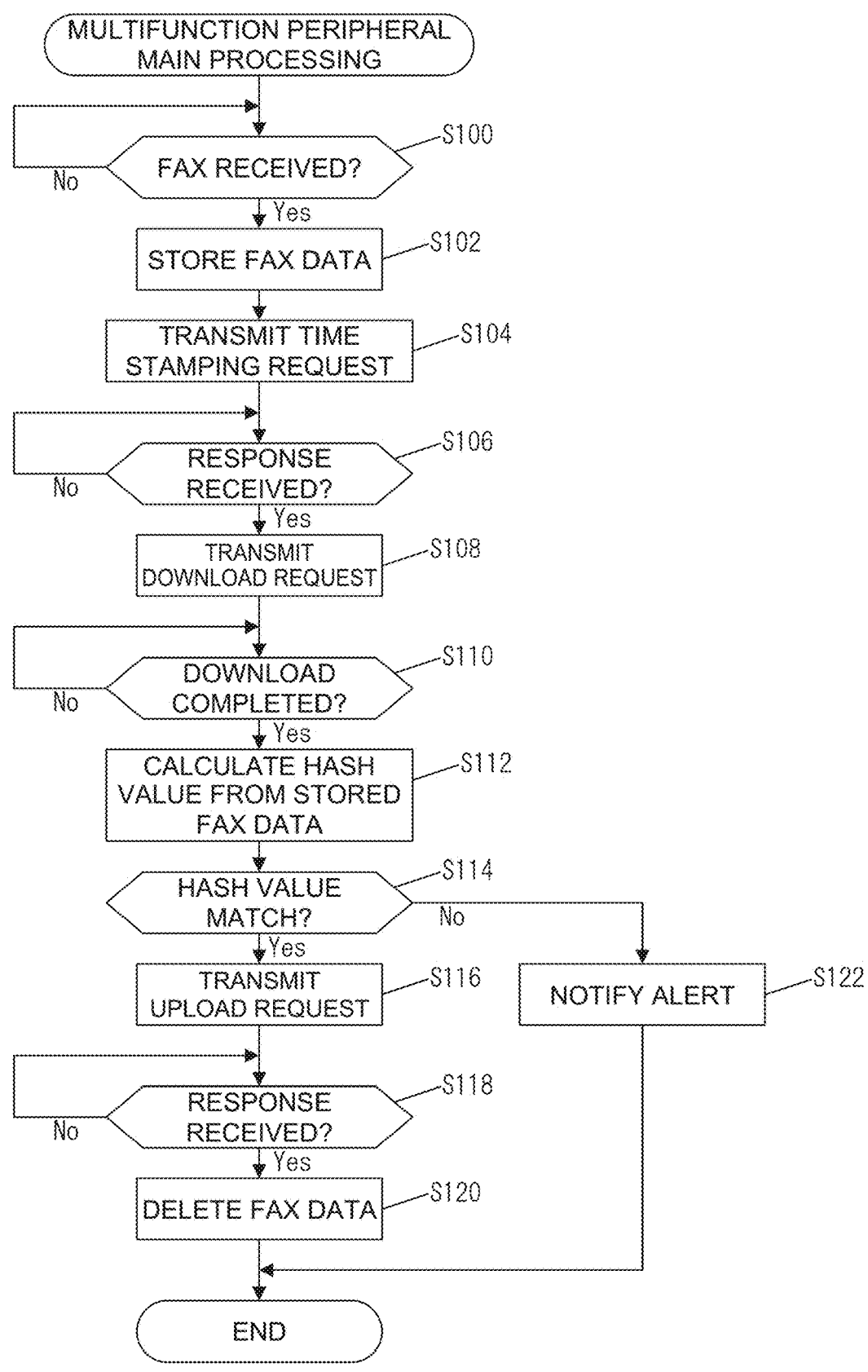
FIG. 6 is a flowchart of main processing in the multifunction peripheral in the first embodiment.

FIG. 6 is a flowchart illustrating a flow of main processing that is executed by the multifunction peripheral 10. The processing illustrated in FIG. 6 is executed at the time when the controller 100 reads the program stored in the storage 160, and is particularly executed when the multifunction peripheral 10 receives FAX data.

First, the controller 100 determines whether a FAX has been received (step S100). Here, reception of the FAX means that the multifunction peripheral 10 receives the FAX data transmitted from the external device via the line communicator 180 or the network communicator 190. If the FAX has not been received, the processing in step S100 is repeatedly executed (step S100; No).

On the other hand, if the FAX has been received, the controller 100 stores the received FAX data in the FAX data storage area 162 (step S100; Yes→step S102). At this time, the controller 100 may store the transmitter information as the attribute information of the FAX data.

Next, the controller 100 (the verifier 104) transmits the time stamping request to the authentication server 20 via the network communicator 190 (step S104). At this time, the controller 100 sets the FAX data received in step S102 as the data to be added with the time stamp token, associates such FAX data with the time stamping request, and transmits the FAX data to the authentication server 20. The processing in step S104 may be executed immediately after the FAX data is stored, or may be executed when the user performs an operation to store the FAX data in the cloud service.

Next, the controller 100 (the verifier 104) determines whether the response has been received from the authentication server 20 via the network communicator 190 (step S106). In step S106, the response received from the authentication server 20 is a response indicating that the time stamp token has been added to the data transmitted to the authentication server 20. If the response has not been received from the authentication server 20, the processing in step S106 is repeatedly executed (step S106; No).

If the response has been received from the authentication server 20, the controller 100 (the verifier 104) transmits the download request to the authentication server 20 via the network communicator 190 (step S106; Yes→step S108). At this time, the controller 100 transmits information indicating that a target of the download request is the data, in which the time stamp token is added to the FAX data transmitted in step S104, in association with the download request.

Next, the controller 100 (the verifier 104) starts downloading the data requested in step S108 via the network communicator 190, and determines whether downloading of the data has been completed (step S110). If downloading has not been completed, the processing in step S110 is repeatedly executed (step S110; No). In this way, the verifier 104 can acquire to obtain the time stamp token including the hash value from the time stamping service.

If downloading has been completed, the controller 100 (the verifier 104) calculates the hash value from the FAX data stored in step S102 (step S110; Yes→step S112).

Next, the controller 100 (the verifier 104) compares the hash value calculated in step S112 with the hash value that is included in the data downloaded in step S110, and determines whether the two compared hash values match each other (step S114). If the two compared hash values match each other, the FAX data stored in step S102 matches the FAX data that is included in the data downloaded in step S110, and thus the verifier 104 can confirm (verify) authenticity of the FAX data received in step S102.

If the two hash values compared in step S112 match each other, that is, if the authenticity of the FAX data stored in step S102 has been confirmed, the controller 100 transmits the upload request to the cloud server 30 via the network communicator 190 (step S114; Yes→step S116). At this time, the controller 100 sets the data downloaded in step S110 (the FAX data added with the time stamp token) as the data to be uploaded, associates such data with the upload request, and transmits the data to the cloud server 30.

Next, the controller 100 determines whether the response has been received from the cloud server 30 via the network communicator 190 (step S118). At this time, the response received from the cloud server 30 is a response that includes information (response information) indicating that the data transmitted to the cloud server 30 has been stored (linked) in the cloud server 30. If the response has not been received from the cloud server 30, the processing in step S118 is repeatedly executed (step S118; No).

On the other hand, if the response has been received from the cloud server 30, the controller 100 deletes the FAX data stored in step S102 from the FAX data storage area 162 (step S118; Yes→step S120). In this way, the controller 100 can delete the FAX data from the FAX data storage area 162 after confirming that the FAX data has been stored (linked) in the cloud service. In other words, the FAX data is stored in the cloud server 30 but not in the multifunction peripheral 10.

Here, if it is determined in step S114 that the two hash values compared in step S112 do not match each other, the controller 100 notifies of the alert (step S114; No→step S122). For example, the controller 100 displays, on the display device 140, a message indicating that an error occurs to the FAX data or a message indicating failure of storing the FAX data the cloud server 30. Here, the FAX data is received and the user is notified of the alert at timing at which the user operates the multifunction peripheral 10, which possibly interferes with the user operation. Thus, as an alert notification method, the controller 100 may display an icon for displaying a message containing a content of the alert in a predetermined area of the display device 140. Then, when the icon is selected, the controller 100 may display the message on the display device 140.

As the alert notification method, the controller 100 may transmit, to the user who operates the multifunction peripheral 10 or an administrator of the multifunction peripheral 10, a mail including the message indicating that the error occurs to the FAX data, or the like. Alternatively, the controller 100 may notify of the alert by causing the multifunction peripheral 10 or the other device to output sound or turn on an indicator.

In the case where the two hash values compared in step S114 do not match each other, notification of the alert is provided, and the FAX data stored in step S102 is not deleted but remains to be stored in the FAX data storage area 162. In this case, the user can check the content of the alert and then print (output) an image based on the FAX data stored in the FAX data storage area 162 on the recording paper or manually transfer the FAX data to the other device.

In the case where uploading of the FAX data to the cloud service has succeeded, the controller 100 may display a message indicating that the FAX data has been uploaded to the cloud service. In addition, when receiving plural pieces of the FAX data, the controller 100 may display a message or a screen indicating the number of FAX data that has been successfully uploaded to the cloud service and that FAX data and the number of FAX data that has not been uploaded to the cloud service and that FAX data.

1.3.3 Flow of Processing in Authentication Server

Figure 7:
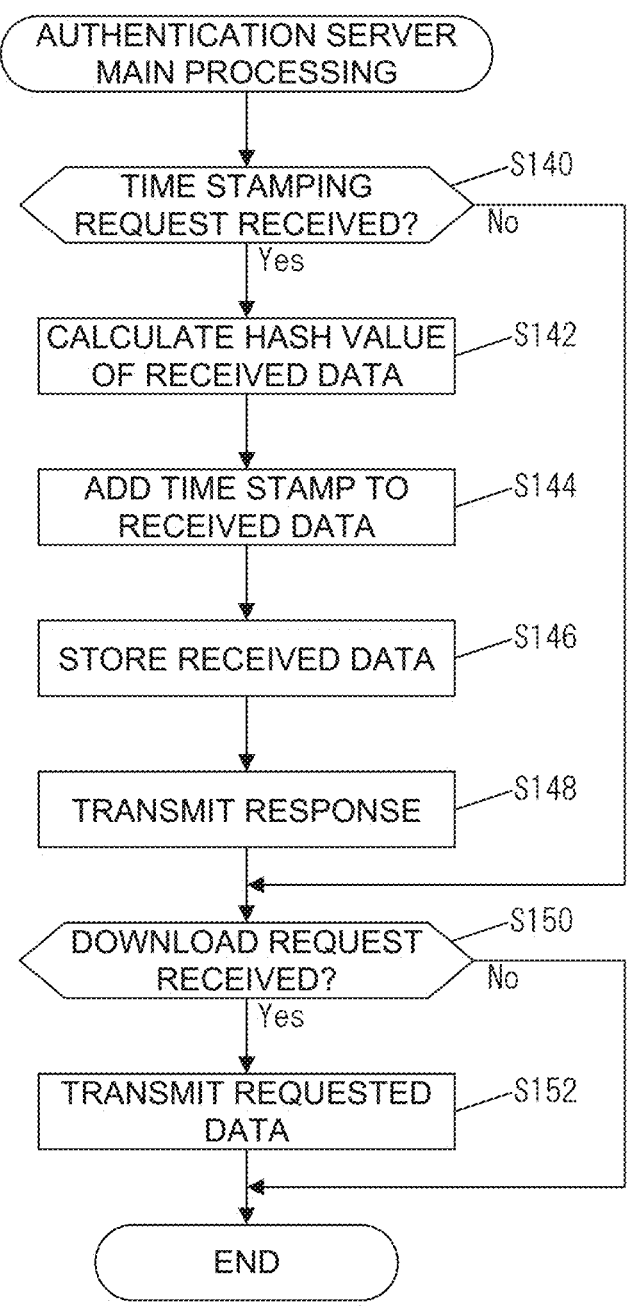
FIG. 7 is a flowchart of main processing in the authentication server in the first embodiment.

FIG. 7 is a flowchart illustrating a flow of main processing that is executed by the authentication server 20. The processing illustrated in FIG. 7 is executed at the time when the controller 200 reads the program stored in the storage 260, and is repeatedly executed while the time stamping service is provided.

First, the controller 200 (the authentication service provider 202) determines whether the time stamping request has been received from the other device via the network communicator 290 (step S140).

If the time stamping request has been received, the controller 200 (the authentication service provider 202) calculates the hash value of the received data as the data to be added with the time stamp token (step S140; Yes→step S142). For example, the data to be added with the time stamp token is transmitted from the other device in association with the time stamping request received in step S140.

Next, the controller 200 (the authentication service provider 202) adds the time stamp token to the data received as the data to be added with the time stamp token (step S144).

Next, the controller 200 (the authentication service provider 202) stores the data added with the time stamp token in step S144 in the received data storage area 362 (step S146). Furthermore, the controller 200 (the authentication service provider 202) transmits, to the device that has transmitted the time stamping request, the response indicating that the data added with the time stamp token is stored via the network communicator 290 (step S148).

If the controller 200 (the authentication service provider 202) determines in step S140 that the time stamping request has not been received from the other device, the processing in step S142 to step S148 is omitted (step S140; No).

Next, the controller 200 (the authentication service provider 202) determines whether the download request has been received from the other device via the network communicator 290 (step S150). If the download request has been received, the controller 200 (the authentication service provider 202) transmits the data as the target of the download request to the device that has transmitted the download request (step S150; Yes→step S152). If the controller 200 (the authentication service provider 202) determines in step S150 that the download request has not been received, the processing in step S152 is omitted (step S150; No).

1.3.4 Flow of Processing in Cloud Server

Figure 8:
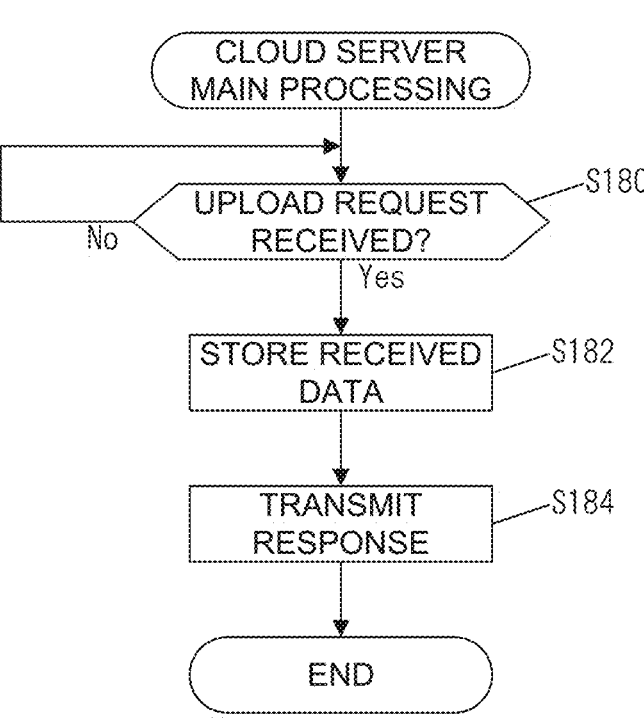
FIG. 8 is a flowchart of main processing in the cloud server in the first embodiment.

FIG. 8 is a flowchart illustrating a flow of main processing that is executed by the cloud server 30. The processing illustrated in FIG. 8 is executed at the time when the controller 300 reads the program stored in the storage 360, and is repeatedly executed while the cloud service is provided.

Next, the controller 300 (the service provider 302) determines whether the upload request has been received from the other device via the network communicator 390 (step S180). If the upload request has not been received, the processing in step S180 is repeatedly executed (step S180; No).

If the upload request has been received, the controller 300 (the service provider 302) stores the data received as the data to be uploaded in the received data storage area 362 (step S180; Yes→step S182). For example, the data to be uploaded is transmitted from the other device in response to the upload request received in step S180. Furthermore, the controller 300 (the service provider 302) transmits, to the device that has transmitted the upload request, the response indicating that uploading has been completed via the network communicator 390 (step S184).

The order of the steps may be changed, or some of the steps may be omitted from those described above to the extent that there is no contradiction. For example, in the case where the response (S1006 in FIG. 5) to the time stamping request (S1004 in FIG. 5) is an error response, the multifunction peripheral 10 may transmit the time stamping request (S1004 in FIG. 5) again. In addition, S1006 and S1008 in FIG. 5 may be omitted, and the authentication server 20 may transmit, as the response to the timestamping request (S1004 in FIG. 5), the data added with the time stamp token (S1008 in FIG. 5).

1.4 Operation Example

Figure 9A:
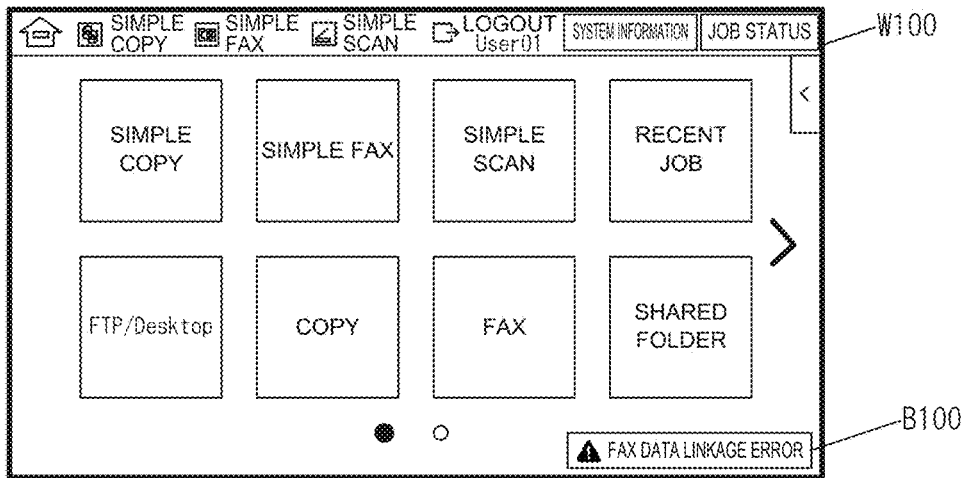
FIGS. 9A to 9C are views, each of which illustrates an operation example in the first embodiment.
Figure 9B:
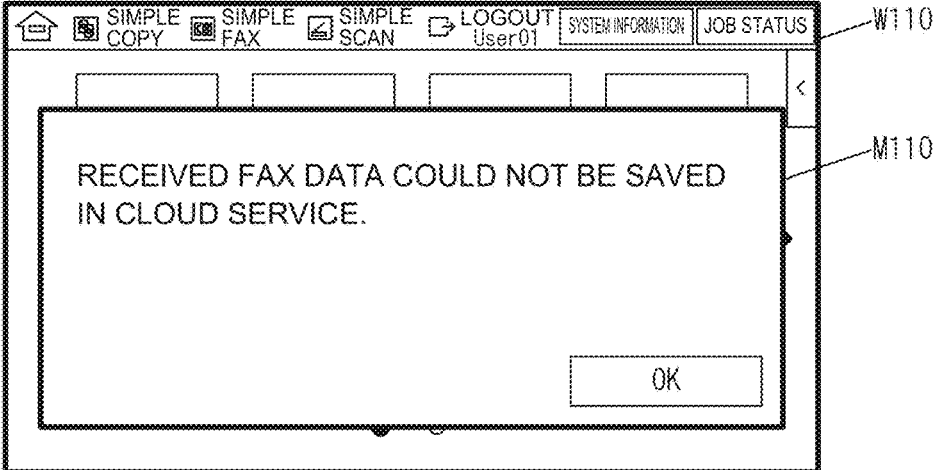
Figure 9C:
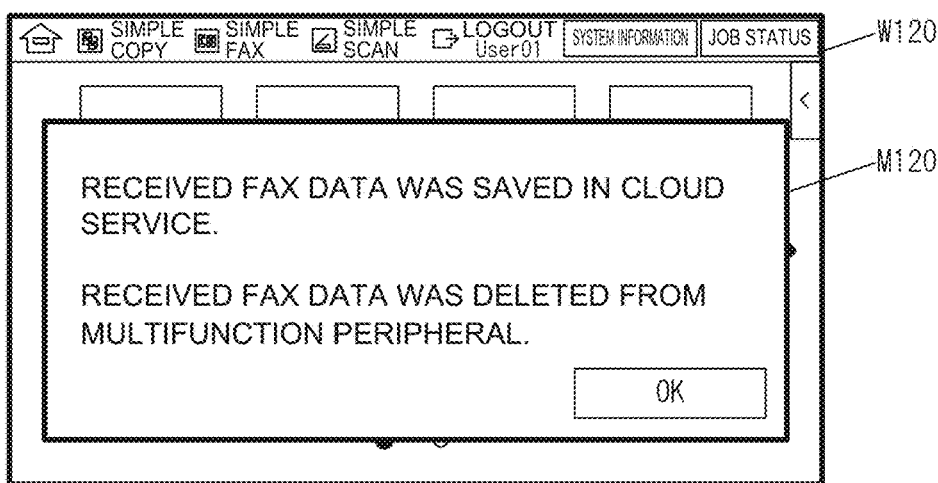

FIGS. 9A to 9C are views, each of which illustrates an operation example and a display screen displayed on the display device 140 of the multifunction peripheral 10.

A screen W100 illustrated in FIG. 9A is an example of a screen including a button B100 indicating that storing of the FAX data in the cloud service has failed. For example, the button B100 includes text such as "FAX DATA LINKAGE ERROR". The user can acknowledge that linkage of the FAX data has failed (the alert) by checking the button B 100. The screen W100 is displayed in step S122 illustrated in FIG. 6.

A screen W110 illustrated in FIG. 9B is an example of a screen that is displayed when the button B100 in FIG. 9A is selected. On the screen W110, a message M110 indicating that storing of the FAX data in the cloud service has failed is displayed as the content of the alert. In the case where storing of the FAX data in the cloud service has failed, the multifunction peripheral 10 may display the screen W110 without displaying the screen W100 that includes the button B100.

The notification may also be made in the case where the FAX data is stored in the cloud service. For example, in the case where the FAX data is stored in the cloud service, a screen W120 illustrated in FIG. 9C may be displayed. The screen W120 includes a message M120 indicating that the FAX data has been stored in the cloud service and is deleted as the multifunction peripheral 10. By checking the message M120, the user can acknowledge that the FAX data has been stored in the cloud service and deleted from the multifunction peripheral 10.

The above description has been made on that the hash value included in the time stamp token is compared with the hash value that is calculated from the FAX data stored in the storage 160 at the timing at which the FAX data added with the time stamp token is downloaded from the time stamping service. However, the timing for comparing the hash values may be timing at which the FAX data added with the time stamp token is uploaded to the cloud service. In this case, the multifunction peripheral 10 transfers the FAX data added with the time stamp token to the cloud service as a linkage destination on the basis of the authentication information and the FAX data (FAX information), and thereby links the FAX data with the cloud service. Meanwhile, the cloud service transmits, to the multifunction peripheral 10, response information indicating that linkage is made. It is assumed that the response information includes the hash value of the FAX data. In the case where the hash value included in the response information matches the hash value that is calculated from the FAX data received from the external device, the multifunction peripheral 10 deletes the FAX data from the multifunction peripheral 10. In the case of mismatching, the multifunction peripheral 10 notifies of the alert. Also, in such a case, the multifunction peripheral 10 determines whether the FAX data transferred to the cloud service matches the received FAX data. In the case of matching, the multifunction peripheral 10 can prove that the FAX data transferred to the cloud service has not been falsified. In the case where the user makes a setting of deleting the FAX data without determining (checking) whether the hash values match each other, the multifunction peripheral 10 may neither determine whether the hash values match each other nor notify of the alert, and may delete the received FAX data.

The above description has also been made on that the hash value included in the time stamp token is compared with the hash value that is calculated from the FAX data (local FAX information) stored by the multifunction peripheral 10. Since the time stamp token includes the time information, it is possible to prove the existence of the FAX data at time indicated by the time information.

Furthermore, the above description has been made on that the time stamp token is used to clarify, with the authenticity thereof, that the FAX data is not falsified and that the FAX data exists at the time indicated by the time information. However, the authenticity may be checked by another method. For example, in the case where it is only required to confirm (verify), as the authenticity, that the FAX data has not been falsified, an electronic signature may be used instead of the time stamp token. In this case, the multifunction peripheral 10 transmits the FAX data to a service that adds the electronic signature to the data, and receives the FAX data added with the electronic signature (the hash value) from the service. Furthermore, the multifunction peripheral 10 compares the electronic signature (the hash value) with the hash value that is calculated from the FAX data (the local FAX information) stored by the multifunction peripheral 10. In the case where the two hash values match each other, the multifunction peripheral 10 can determine that the FAX data has not been falsified, and can confirm the authenticity. Then, the multifunction peripheral 10 can delete the FAX data, the authenticity of which has been confirmed, from the multifunction peripheral 10 after transferring the FAX data to the cloud service. As the authenticity, it may be confirmed (verified) whether a transmitter of the FAX data is legitimate.

As described above, the multifunction peripheral in the present embodiment deletes the FAX data after transferring (linking) the received FAX data to the cloud service. Thus, it is possible to eliminate a need for outputting the image based on the FAX data onto the paper. In addition, the multifunction peripheral in the present embodiment deletes the FAX data therefrom after transferring (linking) the received FAX data to the cloud service. In other words, after transferring the FAX data to the cloud service, the multifunction peripheral in the present embodiment does not have to keep the FAX data until the image based on the FAX data is output (printed) onto the paper. As a result, use efficiency of the memory of the multifunction peripheral in the present embodiment is improved. Thus, the multifunction peripheral in the present embodiment can receive and process a larger amount of the FAX data.

Furthermore, the multifunction peripheral in the present embodiment can provide a proof (a non-falsification proof) that the data to be uploaded to the cloud service has not been falsified by using the identification information, such as the hash value, that indicates the identity of the data. In this case, by uploading the FAX data added with the time stamp token, it is possible to prove the existence of the FAX data at the time indicated by the time information included in the time stamp token.

In the above-described embodiment, the FAX data is used as an example of the data that is transferred to the cloud service and is certified. However, another type of data may be used. For example, in S1000 illustrated in FIG. 5, instead of receiving the FAX, the multifunction peripheral 10 may receive, from the other device, the content data such as data based on a document file or the data based on the image. Then, in S1002, the multifunction peripheral 10 stores the content data.

After forwarding (linking) the received content data to the cloud service, the multifunction peripheral 10 can delete the content data. In addition, since the content data added with the time stamp token is uploaded, it is possible to prove the existence of the content data at time indicated by the time information included in the time stamp token.

2. Second Embodiment

Next, a second embodiment will be described. The second embodiment is an embodiment in which, in the processing that has been described in the first embodiment, storage destinations are sorted according to the FAX transmitter when the FAX data is stored in the cloud service. In the present embodiment, FIG. 2 in the first embodiment is replaced with FIG. 10, and FIG. 6 in the first embodiment is replaced with FIG. 12. The same functional elements and processing will be denoted by the same reference signs, and the description thereon will not be made.

2.1. Functional Configuration

Figure 10:
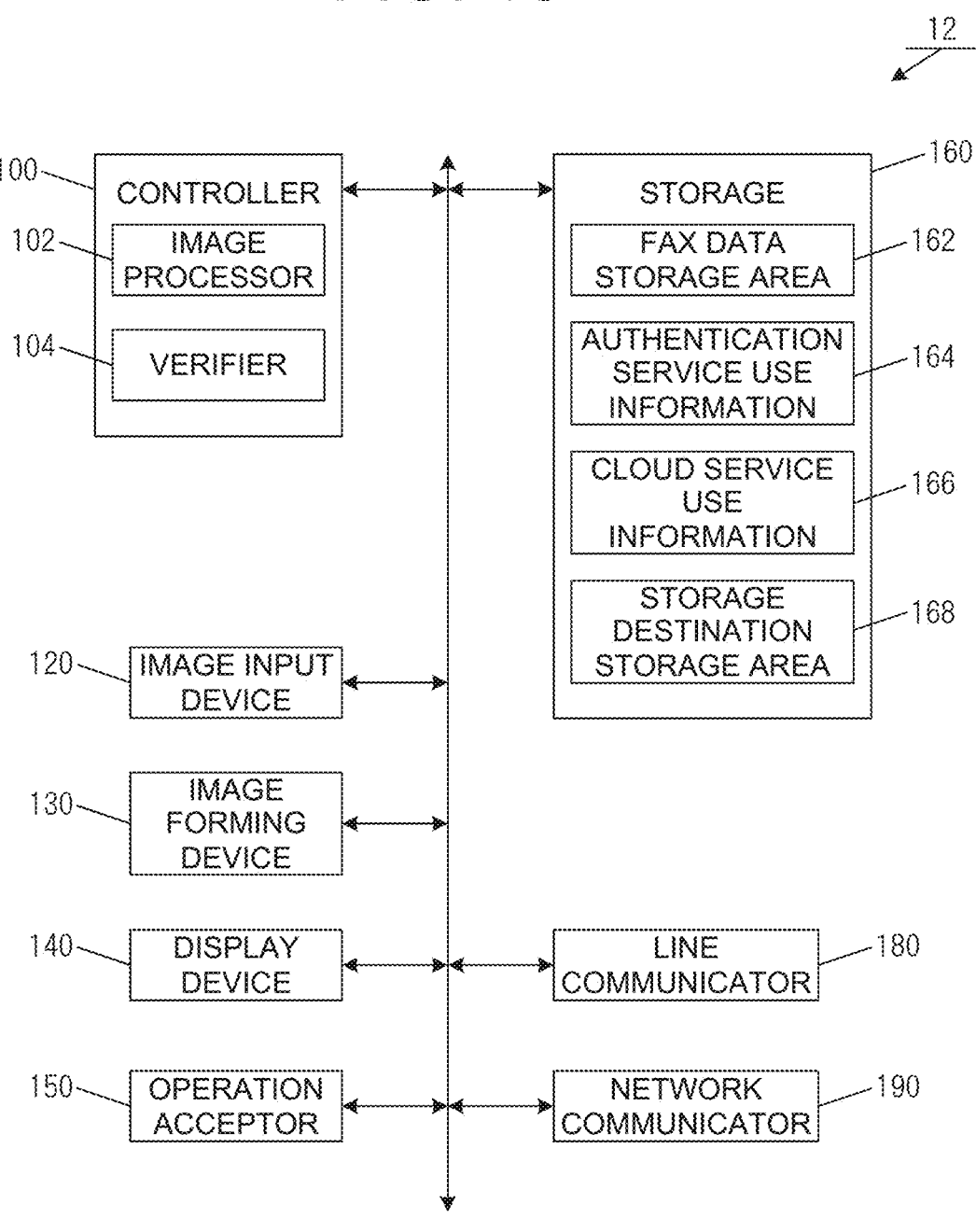
FIG. 10 is a functional configuration diagram of a multifunction peripheral in a second embodiment.

FIG. 10 is a diagram illustrating a functional configuration of a multifunction peripheral 12 in the present embodiment. The multifunction peripheral 12 differs from the multifunction peripheral 10 in the first embodiment in that a storage destination information storage area 168 is further provided in the storage 160.

In the storage destination information storage area 168, information on a storage destination of the FAX data (storage destination information) is stored. For example, as illustrated in FIG. 11, the storage destination information includes: the transmitter information that is information used to identify the transmitter (for example, "03-3000-AAAA"); and a folder name that indicates the storage destination (the storage area) of the FAX data transmitted by the transmitter (for example, a [USER A] folder).

The transmitter information is information with which it is possible to identify the transmitter who has transmitted the FAX data. Examples of the transmitter information are the telephone number (the FAX number) and e-mail addresses of the transmitter and the transmission source. However, the transmitter information may be a name or a nickname of the transmitter, or may be information on a type of the line, via which the FAX data is transmitted.

2.2 Processing Flow 2.2.1 Multifunction Peripheral

Figure 12:
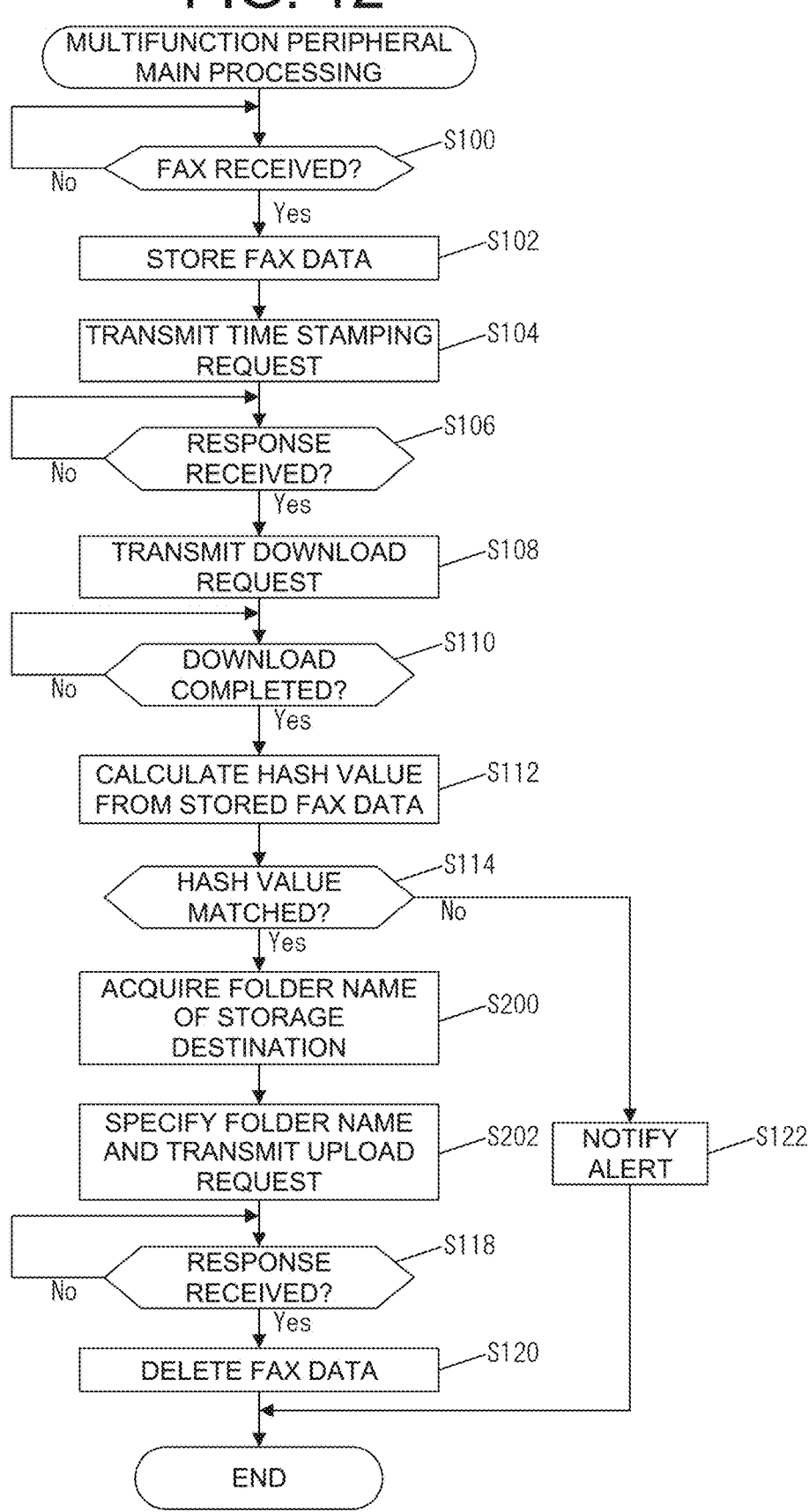
FIG. 12 is a flowchart of main processing in the multifunction peripheral in the second embodiment.

FIG. 12 is a flowchart of a flow of main processing of the multifunction peripheral 12 in the present embodiment. In the present embodiment, if the two hash values, which are compared in step S112, match each other, the controller 100 acquires a folder name of the storage destination of the FAX data (step S114; Yes→step S200).

For example, in step S200, the controller 100 executes two types of processing that are (1) processing to acquire the transmitter information and (2) processing to read the storage destination information that includes the acquired transmitter information and acquire the folder name included in the read storage destination information.

For example, the controller 100 acquires the transmitter information that is stored as the attribute information of the FAX data, or acquires the transmitter information from the FAX data received in step S100. In addition, the controller 100 reads the storage destination information, which includes the acquired transmitter information, from the storage destination information storage area 168 and acquires the storage destination folder name that is included in the read storage destination information.

Next, the controller 100 specifies the folder name acquired in step S200 as the storage destination folder name, and then transmits the upload request to the cloud server 30 (step S202). In this way, the controller 100 can store the FAX data in the storage area (the folder) of the cloud service, which is associated with the transmitter, according to the transmitter information as the information on the transmitter of the FAX data.

Here, there is a case where the controller 100 cannot acquire the folder name of the storage destination of the FAX data in step S200. An example of such a case is a case where the FAX data is received from a user, for whom the storage destination folder is not specified. In such a case, the controller 100 may transmit the upload request to the cloud server 30 without specifying the folder name.

2.2.2 Cloud Server The cloud server 30 executes the processing illustrated in FIG. 8. It is assumed that the folder is added in advance to the received data storage area 362.

Here, there is a case where, in step S180, the controller 300 (the service provider 302) receives the upload request in which the storage destination folder name is specified. In this case, the controller 300 (the service provider 302) executes, as the processing in step S182, processing to store the data, which is received as the data to be uploaded, in the folder with the folder name specified as the storage destination.

In step S180, in the case where the upload request, in which the storage destination folder name is not specified, is received, the controller 300 (the service provider 302) only needs to execute processing to store the received data in a predetermined folder.

When the above-described processing is executed, the multifunction peripheral 12 specifies the folder name that corresponds to the transmitter of the FAX data, and transmits the upload request to the cloud server 30. Then, the cloud server 30 stores the FAX data to be uploaded in the specified folder (storage area). For example, the FAX data that is transmitted from a telephone number A is stored in a telephone number A folder of the cloud service, and the FAX data that is transmitted from a telephone number B is stored in a telephone number B folder of the cloud service.

Just as described, when the FAX data is stored in the cloud server 30, the multifunction peripheral in the present embodiment switches the storage destination of the FAX data according to the transmitter of the FAX data, and can thereby sort the storage destination folders.

3. Third Embodiment

Next, a third embodiment will be described. The third embodiment is an embodiment in which, in the processing that has been described in the first embodiment, the used cloud service is switched according to the FAX transmitter. In the present embodiment, FIG. 2 in the first embodiment is replaced with FIG. 13, and FIG. 6 in the first embodiment is replaced with FIG. 15. The same functional elements and processing will be denoted by the same reference signs, and the description thereon will not be made.

In the present embodiment, a description will be made on that a multifunction peripheral 14, which will be described below, can use the plural cloud services. More specifically, the plural cloud servers 30 are connected to the system 1. The multifunction peripheral 14 can be connected to the plural cloud servers 30.

3.1. Functional Configuration

Figure 13:
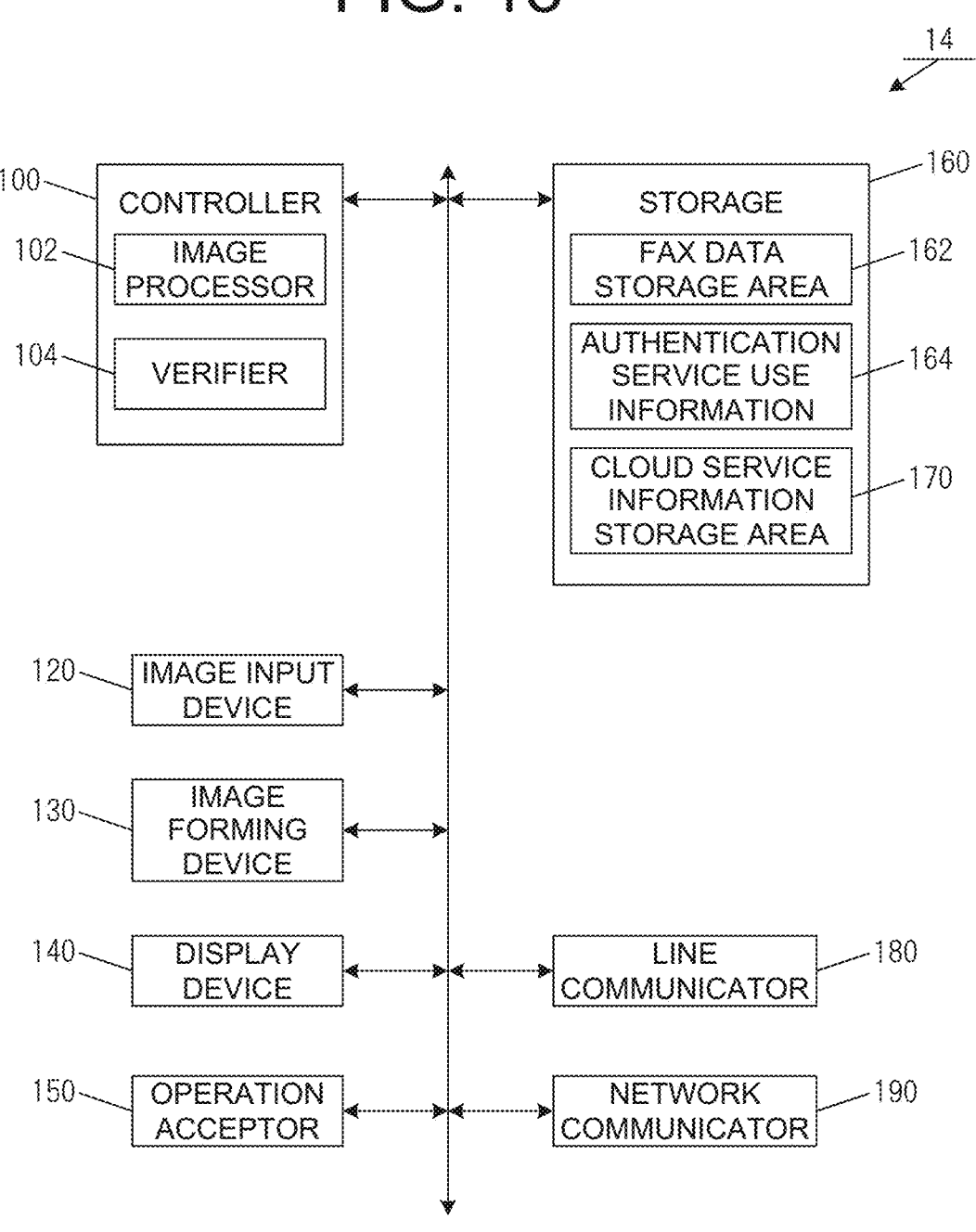
FIG. 13 is a functional configuration diagram of a multifunction peripheral in a third embodiment.

FIG. 13 is a diagram illustrating a functional configuration of the multifunction peripheral 14 in the present embodiment. The multifunction peripheral 14 differs from the multifunction peripheral 10 in the first embodiment in that the multifunction peripheral 14 further includes a cloud service information storage area 170 instead of storing the cloud service use information 166 in the storage 160.

In the cloud service information storage area 170, information on the cloud service that is the storage destination of the FAX data (cloud service information) is stored. For example, as illustrated in FIG. 14, the cloud service information includes: a service name of the cloud service (for example, "AAA Drive"); an access point ("https://aaadrive-.com/upload") that indicates a communication destination for using the cloud service; the authentication information (for example, "ID: a-sha, PW: abc123") that is information used for authentication when the cloud service is used; and the FAX data transmitter information (for example, "03-3000-XXXX, userA@example.com").

Just as described, the multifunction peripheral 14 in the present embodiment can support registration of the plural cloud services and switch the cloud service according to the transmitter information. In the example illustrated in FIG. 14, the FAX data that is transmitted by the user whose telephone number is "03-3000-AAAA" is stored in the "AAA Drive", and the FAX data that is transmitted by the user whose telephone number is "03-3000-BBBB" is stored in a "BBB Drive".

In addition, as indicated by D300 and D302 in FIG. 14, two or more of the cloud services may be associated with the single user. In the example illustrated in FIG. 14, the FAX data that is transmitted by the user whose mail address is "userC@example.com" is stored in the "AAA Drive" and a "CCC Drive". Furthermore, the FAX data that is transmitted by the user whose mail address is "userD@example.com" is stored in the "BBB Drive" and is transmitted to a "DDD Drive" as the mail service.

Here, as indicated by D304 in FIG. 14, the cloud service information storage area 170 may store information on the cloud service that is used when the FAX data including data transmitter information other than the particular transmitter information is received.

3.2 Processing Flow

Figure 15:
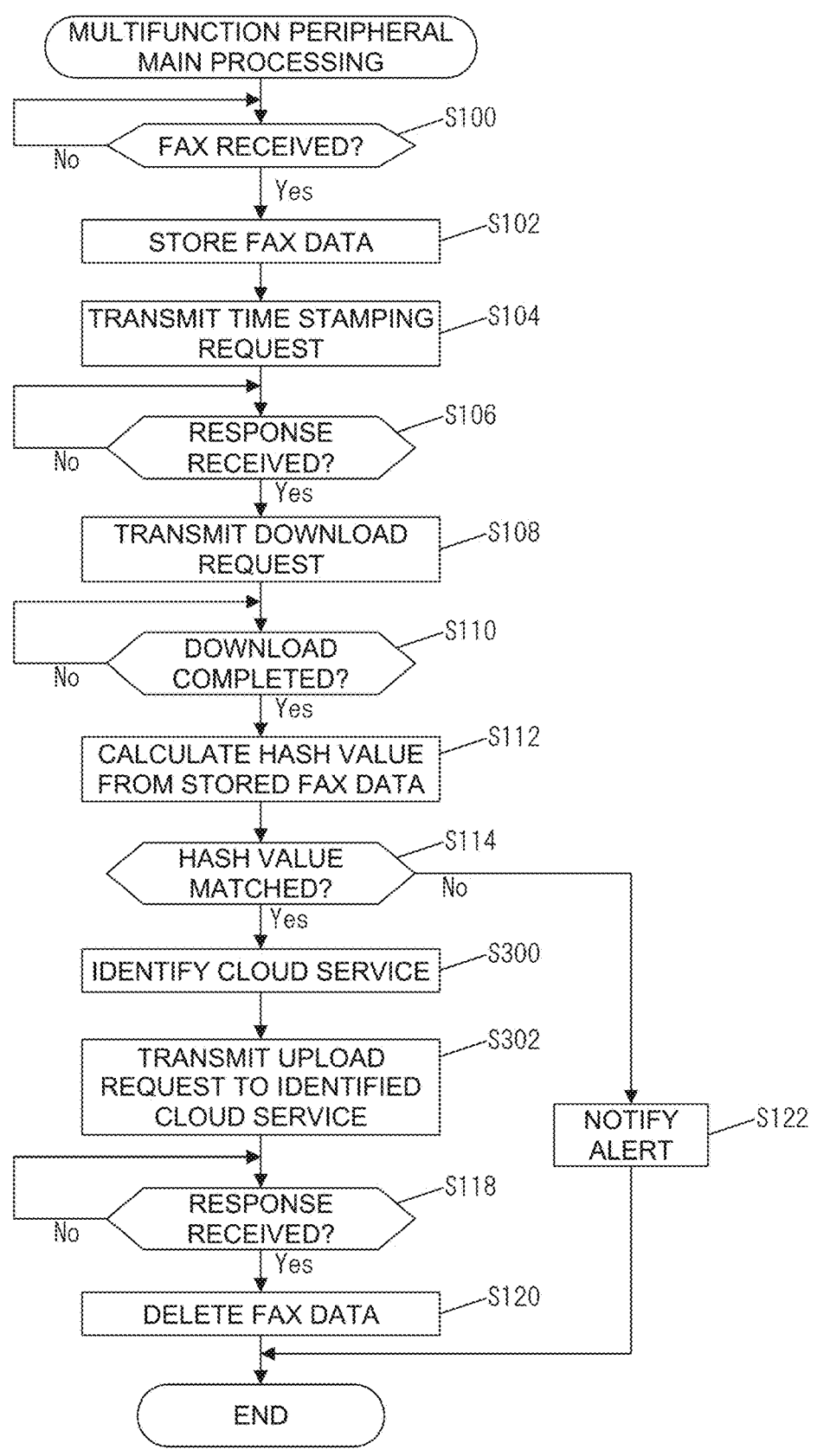
FIG. 15 is a flowchart of main processing in the multifunction peripheral in the third embodiment.

FIG. 15 is a flowchart illustrating a flow of main processing in the multifunction peripheral 14 in the present embodiment. In the present embodiment, if the two hash values, which are compared in step S112, match each other, the controller 100 identifies the cloud service, which is associated with the transmitter, according to the transmitter of the FAX data (step S114; Yes→step S300). For example, the controller 100 acquires the FAX data transmitter information stored in step S102. Furthermore, the controller 100 reads the cloud service information, which includes the acquired transmitter information, from the cloud service information storage area 170. In this way, the controller 100 can identify the cloud service that is associated with the transmitter of the FAX data, and acquire the information on the cloud service.

Next, the controller 100 transmits the upload request to the cloud service that is identified in step S300 (step S302). For example, the controller 100 is connected to the cloud service by using the information on the access point and the authentication information, which are included in the cloud service information read in step S300, and then transmits, to the cloud service, the upload request of the FAX data added with the time stamp token. In this way, the controller 100 can cause the cloud service, which is associated with the transmitter of the FAX data, to store the FAX data according to the transmitter information as the information on the transmitter. In the case where the two or more cloud services are associated with the information on the single transmitter, the FAX data can be stored in the two or more cloud services of the plural cloud services according to the transmitter information that is the information on the transmitter of the FAX data.

Each of the cloud servers 30 communicating with the multifunction peripheral 14 provides the service by executing the processing illustrated in FIG. 8. In this way, each of the cloud servers 30 stores the FAX data, which is received from the multifunction peripheral 14, in response to the upload request from the multifunction peripheral 14.

Just as described, the multifunction peripheral in the present embodiment can switch the cloud service as the transfer destination of the FAX data according to the FAX transmitter.

4. Fourth Embodiment

Figure 16:
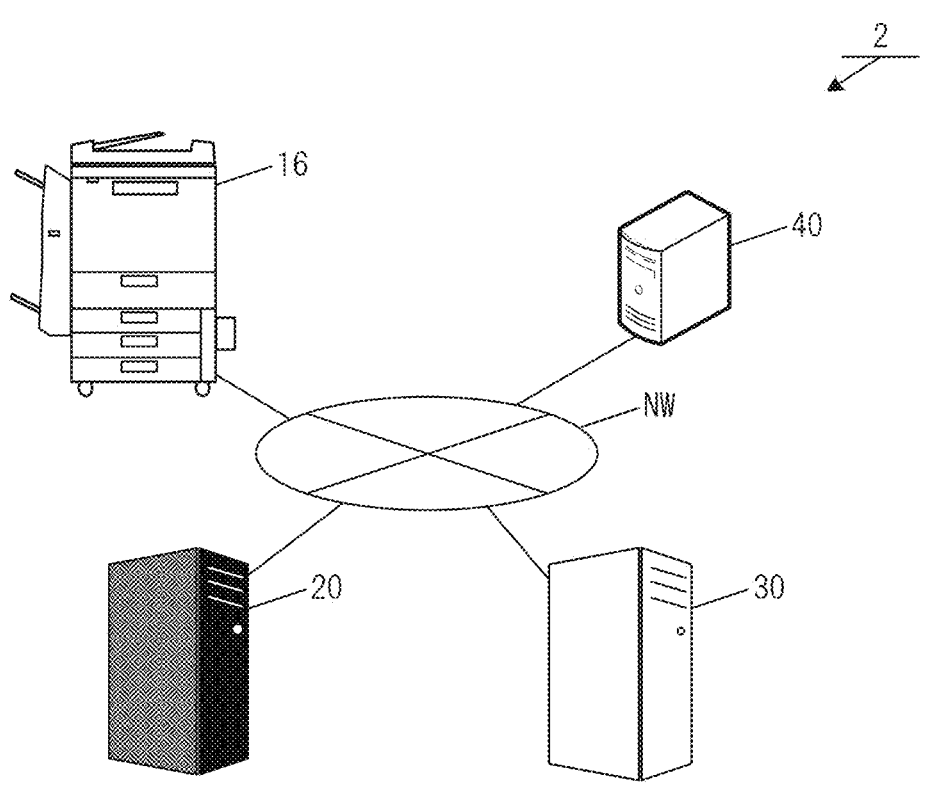
FIG. 16 is an overall configuration view of a system in a fourth embodiment.

Next, a fourth embodiment will be described. The fourth embodiment is an embodiment that differs from the first embodiment in that the multifunction peripheral uploads the FAX data to the cloud service via an intermediate server. In the present embodiment, FIG. 1 in the first embodiment is replaced with FIG. 16, FIG. 2 in the first embodiment is replaced with FIG. 17, FIG. 5 in the first embodiment is replaced with FIG. 19, and FIG. 6 in the first embodiment is replaced with FIG. 20. The same functional elements and processing will be denoted by the same reference signs, and the description thereon will not be made.

4.1 Overall Configuration

IG. 16 is a diagram illustrating an overall configuration of a system 2 in the present embodiment. The system 2 differs from the system 1 illustrated in FIG. 1 in that, instead of the multifunction peripheral 10, a multifunction peripheral 16 is connected to the network NW and an intermediate server 40 is also connected to the network NW.

The intermediate server 40 is a server that transmits data received from the multifunction peripheral 16 to the cloud service. The intermediate server 40 includes a computer such as a server. The intermediate server 40 may include plural devices or may include a virtual server that is implemented on the respective information processing device.

The multifunction peripheral 16 in the present embodiment has a linkage function with the intermediate server 40. The linkage function with the intermediate server 40 is a function to transmit the FAX data to the intermediate server 40 when the FAX data is received.

4.2 Functional Configuration 4.2.1 Multifunction Peripheral

Figure 17:
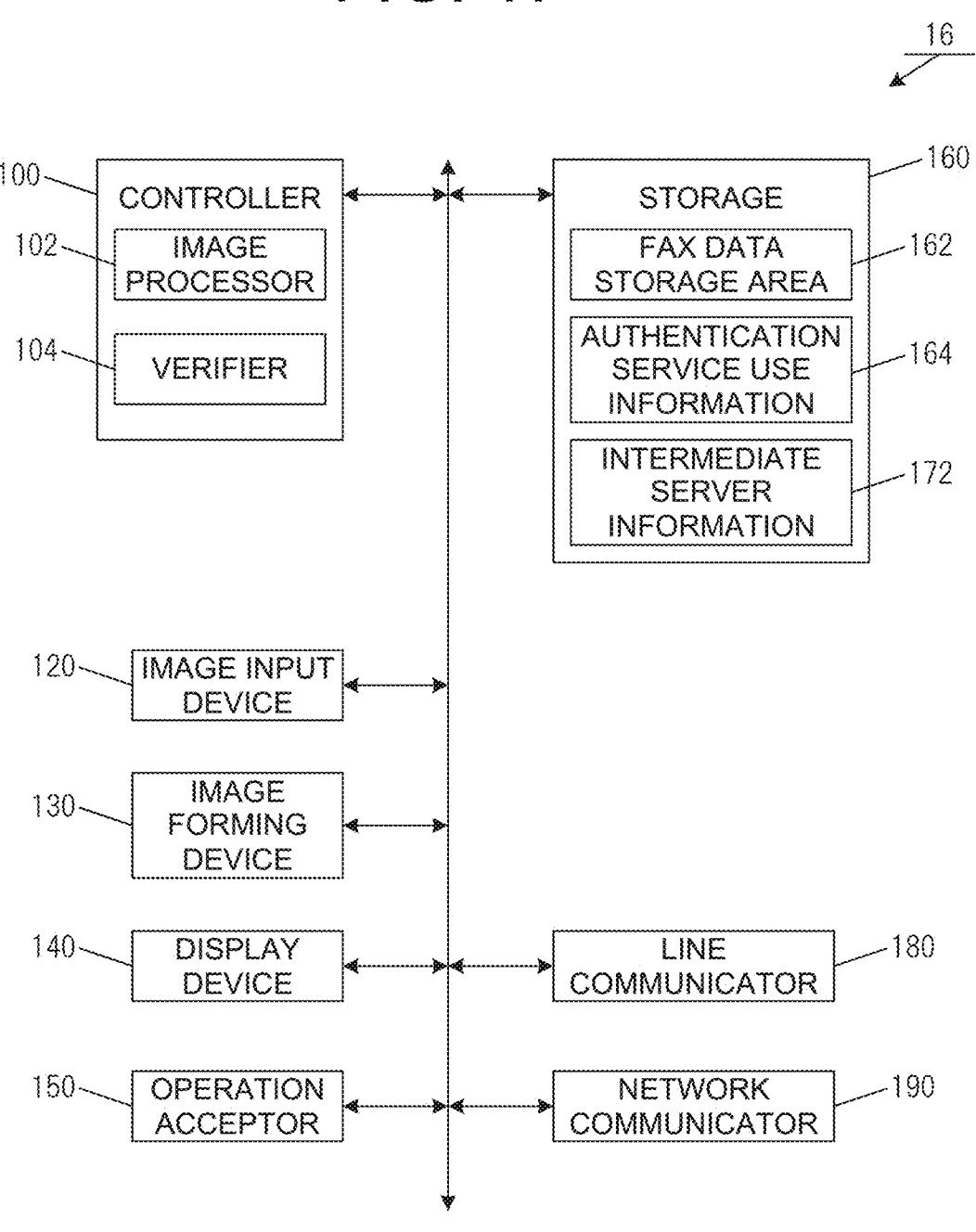
FIG. 17 is a functional configuration diagram of a multifunction peripheral in the fourth embodiment.

FIG. 17 is a diagram illustrating a functional configuration of the multifunction peripheral 16 in the present embodiment. The multifunction peripheral 16 differs from the multifunction peripheral 10 in the first embodiment in that, instead of the cloud service use information 166, intermediate server information 172 is stored in the storage 160.

The intermediate server information 172 is information on the intermediate server 40. The intermediate server information 172 is information that is used to connect to the intermediate server 40. For example, the intermediate server information 172 includes information on a connection destination (for example, an URL or an IP address) of the intermediate server 40.

4.2.2 Intermediate Server

Figure 18:
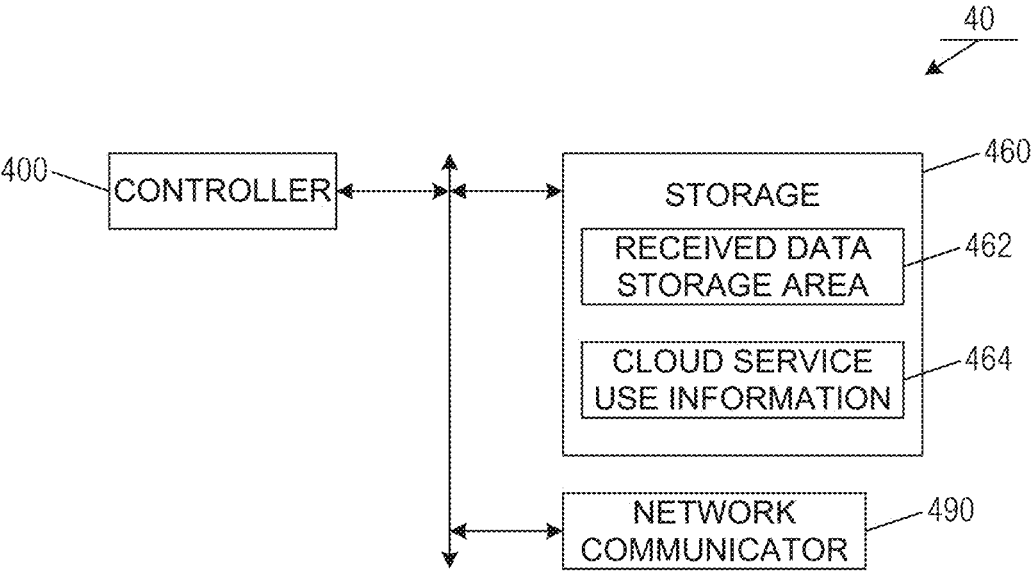
FIG. 18 is a functional configuration diagram of an intermediate server in the fourth embodiment.

FIG. 18 is a diagram illustrating a functional configuration of the intermediate server 40 in the present embodiment. The intermediate server 40 includes a controller 400, a storage 460, and a network communicator 490.

The controller 400 is a functional device for controlling the entire intermediate server 40. The controller 400 reads and executes various programs stored in the storage 460 to implement various functions, and includes one or more CPUs, and the like, for example. The controller 400 may include an SoC having plural functions of the functions described below.

The storage 460 stores the various programs required for operation of the intermediate server 40 and various types of the data. The storage 460 includes storage devices such as an SSD, which is semiconductor memory, and an HDD.

The storage 460 secures a received data storage area 462 as a storage area, and stores cloud service use information 464.

The received data storage area 462 stores data that is received from the multifunction peripheral 16. The cloud service use information 464 is information that is used to use the cloud service. The cloud service use information 464 is similar information to the cloud service use information 166 in the first embodiment.

The network communicator 490 communicates with the other devices and equipment, such as the multifunction peripheral 16, via the network such as the LAN or the WAN. The network communicator 490 includes, for example, a communication device, such as an NIC, and a communication module used in the wired/wireless LAN. The network communicator 490 may include an interface (a network I/F) that can be connected to the network.

4.3 Processing Flow 4.3.1 Overall Processing Flow

Figure 19:
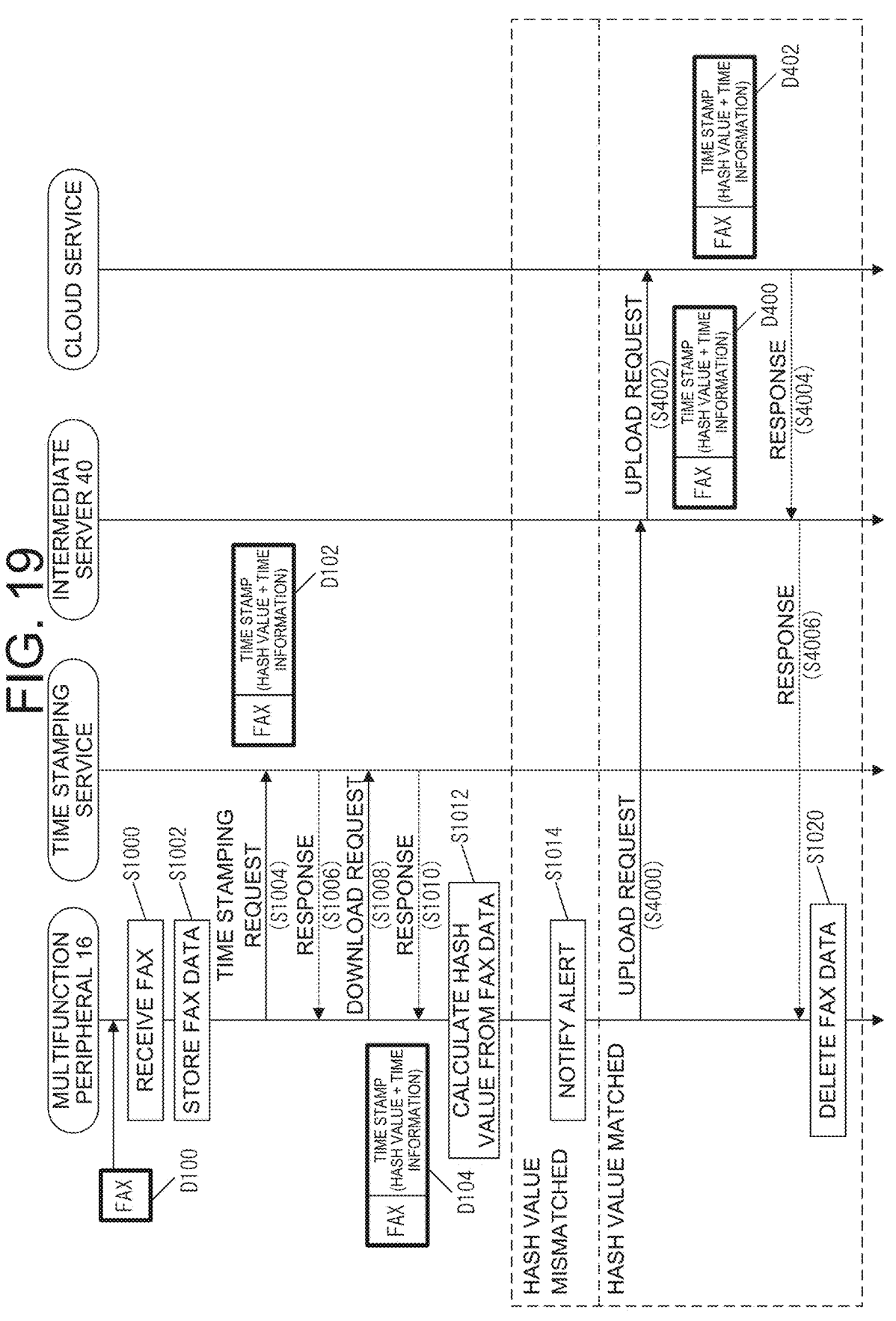
FIG. 19 is a sequence chart illustrating a flow of processing in the fourth embodiment.

FIG. 19 is a sequence chart illustrating a flow of processing that is executed by the apparatus and the devices included in the system 2. In the present embodiment, in the case where the hash value that is calculated from the FAX data matches the hash value that is included in the time stamp token added to the FAX data, the multifunction peripheral 16 transmits the upload request to the intermediate server 40 (S4000). At this time, the multifunction peripheral 16 associates the data to be uploaded (the FAX data added with the time stamp token) with the upload request, and transmits the data to the intermediate server 40. The intermediate server 40 thereby acquires the upload request and the FAX data added with the time stamp token (D400 in FIG. 19) from the multifunction peripheral 16.

In the case where the intermediate server 40 receives the upload request from the multifunction peripheral 16, the intermediate server 40 sets the data transmitted from the multifunction peripheral 16 as the data to be uploaded, and further transmits the upload request to the cloud service (S4002). At this time, the intermediate server 40 associates the data to be uploaded (the FAX data added with the time stamp token) with the upload request, and transmits the data to the cloud service.

When receiving the upload request from t the intermediate server 40, the cloud service provided by the cloud server 30 stores the FAX data that is transmitted from the intermediate server 40 and added with the time stamp token (D402 in FIG. 19), and transmits a response to the intermediate server 40 (S4004).

When receiving the response from the cloud service, the intermediate server 40 transmits a response to the multifunction peripheral 16 (S4006). After receiving the response from the intermediate server 40, the multifunction peripheral 16 deletes, from the FAX data storage area 162, the FAX data (the FAX data stored in step S1002) that corresponds to the data uploaded to the intermediate server 40.

4.3.2 Multifunction Peripheral

Figure 20:
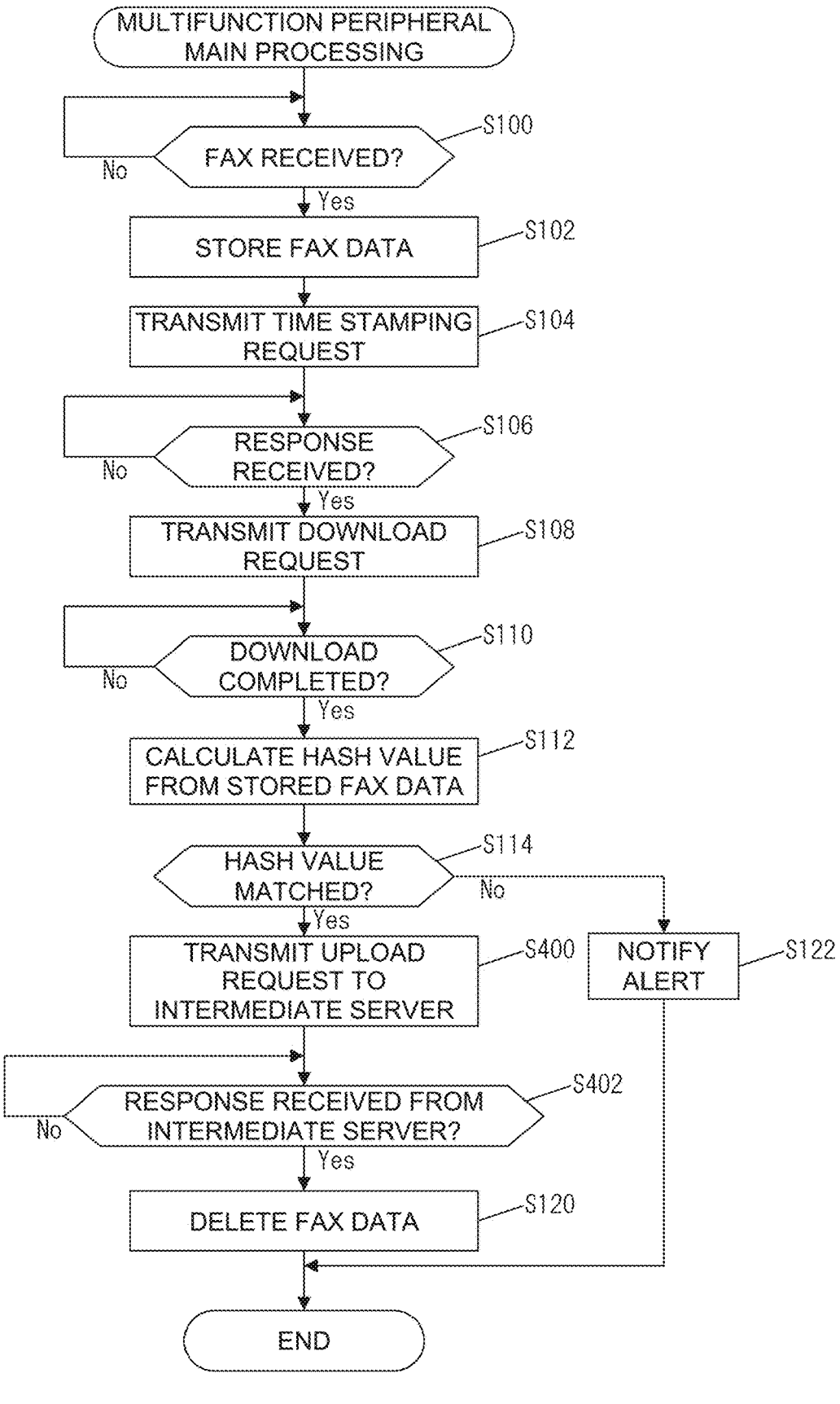
FIG. 20 is a flowchart of main processing in the multifunction peripheral in the fourth embodiment.

FIG. 20 is a flowchart illustrating a flow of main processing in the multifunction peripheral 16 in the present embodiment. In the present embodiment, if the two hash values, which are compared in step S112, match each other, the upload request is transmitted to the intermediate server 40 (step S114; Yes→step S400).

Next, the controller 100 determines whether the response has been received from the intermediate server 40 via the network communicator 190 (step S402). At this time, the response received from the intermediate server 40 is a response indicating that the data transmitted to the intermediate server 40 has been stored (linked) in the cloud server 30. If the response has not been received from the intermediate server 40, the processing in step S402 is repeatedly executed (step S402; No).

On the other hand, if the response has been received from the intermediate server 40, the controller 100 deletes the FAX data stored in step S102 from the FAX data storage area 162 (step S402; Yes→step S120).

4.3.3 Intermediate Server

Figure 21:
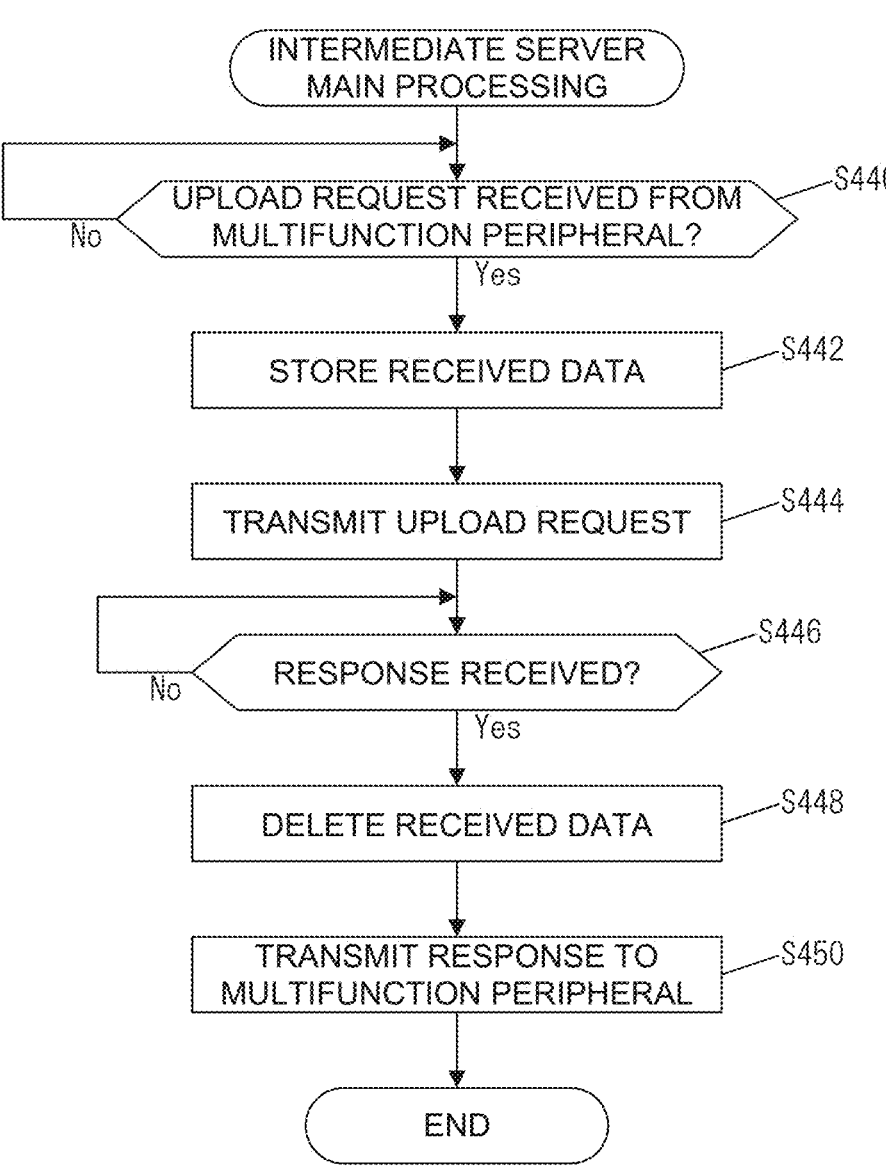
FIG. 21 is a flowchart of main processing in the intermediate server in the fourth embodiment.

FIG. 21 is a flowchart illustrating a flow of main processing in the intermediate server 40 in the present embodiment. The processing illustrated in FIG. 21 is executed at the time when the controller 400 reads the program stored in the storage 460, and is repeatedly executed.

First, the controller 400 determines whether the upload request has been received from the multifunction peripheral 16 (step S440). If the upload request has not been received from the multifunction peripheral 16, the processing in step S440 is repeatedly executed (step S440; No).

If the upload request has been received from the multifunction peripheral 16, the controller 400 stores the data received from the multifunction peripheral 16 in the received data storage area 462 (step S440; Yes→step S442).

Next, the controller 400 transmits the upload request to the cloud server 30 via the network communicator 490 (step S444). At this time, the controller 400 sets the data received in step S440 (the FAX data added with the time stamp token) as the data to be uploaded, associates such data with the upload request, and transmits the data to the cloud server 30.

Next, the controller 400 determines whether the response has been received from the cloud server 30 via the network communicator 490 (step S446). At this time, the response received from the cloud server 30 is a response indicating that the data transmitted to the cloud server 30 has been stored in the cloud server 30. If the response has not been received from the cloud server 30, the processing in step S446 is repeatedly executed (step S446; No).

On the other hand, if the response has been received from the cloud server 30, the controller 400 deletes the FAX data stored in step S442 from the received data storage area 462 (step S446; Yes→step S448).

Next, the controller 400 transmits the response to the multifunction peripheral 16, which has transmitted the upload request, via the network communicator 490, and the response indicates that the data transmitted to the intermediate server 40 has been stored (linked) in the cloud server 30 (step S450).

4.3.4 Cloud Server

The cloud server 30 executes the processing illustrated in FIG. 8. In the present embodiment, the upload request is transmitted from the intermediate server 40. Thus, in step S180, the controller 300 (the service provider 302) receives the upload request from the intermediate server 40. Then, in step S184, the controller 300 (the service provider 302) transmits the response to the intermediate server 40.

As described above, in the system in the present embodiment, the multifunction peripheral has the linkage function with the intermediate server, and the intermediate server has the linkage function with each of the cloud services. Therefore, even in the case where the number of the cloud services as the linkage destinations of the multifunction peripheral is increased, it is only required to modify the intermediate server, and thus the main functions of the multifunction peripheral are not affected.

The system in the present embodiment may include the plural multifunction peripherals. In this case, each of the multifunction peripherals is linked with the intermediate server, and can transmit the FAX data to the cloud service via the intermediate server. The intermediate server has the information on the cloud service (cloud service use information). Thus, in the case where the cloud services that are linked with the multifunction peripherals are increased or changed, the user such as the administrator of the system only needs to modify the cloud service use information provided to the intermediate server. As a result, even in the case where the cloud services that are linked with the multifunction peripherals are increased or changed, there is no need to change the settings of each of the multifunction peripherals, which allows to reduce cost and operations related to the settings change.

5. Modifications

The present disclosure is not limited to the above-described embodiments, and various modifications can be made thereto. In other words, the technical scope of the present disclosure also includes an embodiment obtained by combining technical measures modified as appropriate without departing from the gist of the present disclosure.

Although some parts of the above-described embodiments are separately described for convenience of explanation, it is needless to say that the embodiments may be combined and implemented within a technically allowable range. For example, the second and third embodiments may be combined. In this case, the multifunction peripheral can switch the cloud service and the storage destination (the storage area) in the cloud service according to the transmitter. In addition, the fourth embodiment may be combined with the second embodiment or the third embodiment. In this case, the intermediate server switches the storage destination of the FAX data and the cloud service to be used on the basis of the transmitter information that is included in the FAX data received from the multifunction peripheral.

In the above-described embodiment, the description has been made on that the FAX data is used as the data processed by the multifunction peripheral 10. However, in any of the embodiments, the content data can be processed instead of the FAX data.

The program that is operated on each of the devices in the embodiment is a program that controls the CPU and the like (a program that makes a computer function) to implement the functions in the above-described embodiments. The information that is handled in the devices is temporarily accumulated in a temporary storage device (for example, RAM) during processing, is then stored in various storage devices such as read-only memory (ROM) and the HDD, and is read, corrected, and written by the CPU when necessary.

Here, the recording medium that stores the program may be, for example, any of a semiconductor medium (e.g., a ROM or a non-volatile memory card), an optical recording medium/magneto-optical recording medium (e.g., Digital Versatile Disc (DVD)), a Magneto Optical Disc (MO), a Mini Disc (MD), a Compact Disc (CD), and a Blu-ray® disc (BD)), and a magnetic recording medium (e.g., a magnetic tape and a flexible disk). Furthermore, the functions according to the above embodiments are implemented through execution of the loaded program, and also the functions according to the present disclosure may be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

Each functional block or various features of the device used according to the embodiments described above may be implemented or executed in an electrical circuit, e.g., an integrated circuit or a plurality of integrated circuits. The electrical circuit designed to perform the functions described herein may include general-purpose processors, digital signal processors (DSP), application-specific integrated circuits (ASIC), field programmable gate arrays (FPGA), or other programmable logic devices, discrete gate or transistor logic, discrete hardware components, or a combination of these. A general-purpose processor may be a microprocessor or a conventional processor, controller, microcontroller, or state machine. The electrical circuit described above may include a digital circuit or an analog circuit. When an integrated circuit technology that replaces the current integrated circuits emerges as a result of advances in semiconductor technology, one or more aspects of the present disclosure may also use new integrated circuits based on such technology. For example, the above-described controller may include a control circuit, and the storage may include a memory circuit.

What is claimed is:

1. An image processing apparatus comprising:
a storage; and
a controller, wherein
    the storage stores data that is acquired from an external apparatus, and
    the controller acquires, from an authentication service, a time stamp token that is added to the data, the time stamp token including a first hash value,
    the controller compares whether a second hash value that is generated from the data stored in the storage matches the first hash value that is included in the time stamp token, and
    the controller, when the second hash value matches the first hash value, transmits the data to a cloud server, and deletes the data from the storage in a case that the image processing apparatus receives, from the cloud server, a response to the data transmission.

2. The image processing apparatus according to claim 1, wherein
    the time stamp token includes time information that is added by the authentication service.

3. The image processing apparatus according to claim 1, wherein
    the response indicates that the data is linked to the cloud server.

4. The image processing apparatus according to claim 1, wherein
    the controller causes the cloud server to store the data in a storage area that is associated with a transmitter that has transmitted the data according to information on the transmitter.

5. The image processing apparatus according to claim 1, wherein
    the cloud server includes a plurality of cloud servers, and
    the controller transmits the data to a cloud server, of the plurality of cloud servers, that is associated with a transmitter that has transmitted the data according to information on the transmitter.

6. The image processing apparatus according to claim 5, wherein
    the controller transmits the data to two or more of the plurality of cloud servers according to the information on the transmitter that has transmitted the data.

7. The image processing apparatus according to claim 1, wherein
    the data includes image data.

8. The image processing apparatus according to claim 1, wherein
    the data includes FAX data that is received from the external apparatus via a FAX line,
    when the second hash value does not match the first hash value, the image processing apparatus:
    displays a notification on a display of the image processing apparatus, or
    transmits the notification to a device of a user operating the image processing apparatus or an administrator of the image processing apparatus, and
    the notification includes a message indicating that an error has occurred with regard to the FAX data or a message indicating a failure of storing the FAX data in the cloud server.

9. A system including an image processing apparatus that communicates with a cloud server and a time stamping server, wherein the image processing apparatus calculates a first hash value of data that is acquired from an external apparatus, the image processing apparatus transmits, to the time stamping server, a request to add a time stamp token to the data, the image processing apparatus receives, from the time stamping server, data added with the time stamp token, and stores the data added with the time stamp token, the cloud server receives the data added with the time stamp token from the image processing apparatus, and stores the data added with the time stamp token, and in a case that the first hash value matches a second hash value included in the time stamp token, the image processing apparatus deletes the data added with the time stamp, that is stored in the image processing apparatus, in a case that the image processing apparatus receives, from the cloud server, a response to the reception of the data added with the time stamp token.

10. The system according to claim 9, wherein the cloud server includes a plurality of cloud servers, and the image processing apparatus transmits the data added with the time stamp token to the cloud server that is associated with a transmitter that has transmitted the data added with the time stamp token according to information on the transmitter.

11. A data management method performed by an image processing apparatus, the data management method comprising:

storing data, that is acquired from an external apparatus, in a storage device;

acquiring, from an authentication service, a time stamp token that is added to the data, the time stamp token including a first hash value;

comparing whether a second hash value that is generated from the data stored in the storage matches the first hash value that is included in the time stamp token;

in a case that the second hash value matches the first hash value, transmitting the data to a cloud server; and deleting the data from the storage device in a case that the image processing apparatus receives, form the cloud server, a response to the data transmission.

12. The system according to claim 9, wherein the data includes FAX data that is received from the external apparatus, when the first hash value does not match the second hash value, the image processing apparatus:

displays a notification on a display of the image processing apparatus, or transmits the notification to a device of a user operating the image processing apparatus or an administrator of the image processing apparatus, and the notification includes a message indicating that an error has occurred with regard to the FAX data or a message indicating a failure of storing the FAX data in the cloud server.

13. The data management method according to claim 11, wherein the data includes FAX data that is received from the external apparatus, when the second hash value does not match the first hash value, the data management method further comprises:

displaying a notification on a display of the image processing apparatus, or transmitting the notification to a device of a user operating the image processing apparatus or an administrator of the image processing apparatus, and the notification includes a message indicating that an error has occurred with regard to the FAX data or a message indicating a failure of storing the FAX data in the cloud server.

* * * * *